US 6,594,103 B1

(12) United States Patent
Despain et al.

(10) Patent No.: US 6,594,103 B1
(45) Date of Patent: Jul. 15, 2003

(54) READ CHANNEL GENERATING ABSOLUTE VALUE SERVO SIGNAL

(75) Inventors: Alvin M. Despain, Pacific Palisades, CA (US); R. Stockton Gaines, Pacific Palisades, CA (US)

(73) Assignee: Acorn Technologies, Inc., Pacific Palisades, CA (US)

( * ) Notice: Subject to any disclaimer, the term of this patent is extended or adjusted under 35 U.S.C. 154(b) by 0 days.

(21) Appl. No.: 09/438,677

(22) Filed: Nov. 12, 1999

(51) Int. Cl.⁷ .............................................. G11B 5/596

(52) U.S. Cl. ..................... 360/77.06; 360/53; 360/65

(58) Field of Search .............................. 360/77.06, 65, 360/53, 31, 46; 714/795; 369/43

(56) References Cited

U.S. PATENT DOCUMENTS

| 4,056,830 A | 11/1977 | Smith ........................ 360/51 |
| 4,204,234 A | 5/1980 | Noble ........................ 360/77 |
| 4,404,676 A | 9/1983 | DeBenedictis | |
| 4,445,153 A | 4/1984 | Fujimoto et al. ............ 360/77 |
| 4,499,510 A | 2/1985 | Harding et al. .............. 360/77 |
| 4,563,713 A | 1/1986 | Cahoon ..................... 360/75 |
| 4,642,709 A | 2/1987 | Vinal ........................ 360/77 |
| 4,701,815 A | 10/1987 | Yada et al. .................. 360/77 |
| 4,772,963 A | 9/1988 | Van Lahr et al. ............ 360/47 |
| 4,816,938 A | 3/1989 | Cowen et al. | |
| 4,816,947 A | 3/1989 | Vinal et al. ................ 360/113 |
| 4,890,172 A | 12/1989 | Watt et al. ............... 360/77.04 |
| 4,920,442 A | 4/1990 | Dimmick | |
| 4,924,160 A | 5/1990 | Tung ......................... 318/561 |
| 5,073,834 A | 12/1991 | Best et al. ................ 360/77.08 |
| 5,189,572 A | 2/1993 | Gooch | |
| 5,233,487 A | 8/1993 | Christensen et al. | |

(List continued on next page.)

FOREIGN PATENT DOCUMENTS

| DE | 39 00 683 A1 | 7/1990 |
| DE | 197 12 568 A1 | 1/1998 |
| EP | 0 298 475 A1 | 7/1988 |
| EP | 0 331 189 A2 | 3/1989 |
| JP | 61104358 | 5/1986 |
| JP | 04089654 | 3/1992 |
| JP | 08036811 | 2/1996 |
| JP | 10011844 | 1/1998 |
| WO | WO 99/36907 | 7/1999 |
| WO | PCT/US/99/26036 | 3/2000 |

OTHER PUBLICATIONS

L.N. He, et al., "Estimation of Track Misregistration by Using Dual–Stripe Magnetoresistive Heads," IEEE Transactions on Magnetics, vol. 34, No. 4, pp. 2348–2355, Jul. 1998.

(List continued on next page.)

Primary Examiner—David Hudspeth
Assistant Examiner—Dan I. Davidson
(74) Attorney, Agent, or Firm—Hogan & Hartson, L.L.P.

(57) ABSTRACT

A servo control system and method controls systems at least partially on the basis of an observable variable that has an absolute value functional relationship with the controlled variable and does not change sign for positive and negative variations from a nominal value. The control system and method find particularly advantageous application in magnetic storage hard disk drive systems because the system allows such hard disk drives to perform servo operations such as track following on the basis of the data signals being read from the track. A particularly useful source of the absolute value observable variable is a read channel chip that performs decoding of data recovered from the disk. Error measures are developed as the data signals from the disk are processed and decoded, including error measures from the slicer used in an adaptive equalization process and from the data decoder, which may be a Viterbi decoder. One or more of these error measures is provided to an output terminal of the read channel chip for use with an absolute value control system and method.

10 Claims, 21 Drawing Sheets

U.S. PATENT DOCUMENTS

| | | | |
|---|---|---|---|
| 5,490,091 A | 2/1996 | Kogan et al. | 364/554 |
| 5,499,232 A | 3/1996 | Hardwick | 369/275.3 |
| 5,523,902 A | 6/1996 | Pederson | |
| 5,541,783 A | 7/1996 | Yamamoto et al. | |
| 5,585,975 A | 12/1996 | Bliss | |
| 5,661,760 A | 8/1997 | Patapoutian et al. | 375/341 |
| 5,668,678 A | 9/1997 | Reed et al. | |
| 5,677,809 A | 10/1997 | Kadlec | |
| 5,717,538 A | 2/1998 | Cheung et al. | |
| 5,724,205 A | 3/1998 | Choi | |
| 5,754,353 A | 5/1998 | Behrens et al. | |
| 5,796,534 A | 8/1998 | Yamamoto et al. | 360/48 |
| 5,796,543 A | 8/1998 | Ton-That | |
| 5,825,579 A | 10/1998 | Cheung et al. | |
| 5,841,601 A | 11/1998 | Fisher | |
| 5,847,894 A | 12/1998 | Blank et al. | |
| 5,875,066 A | 2/1999 | Ottesen | 360/77.11 |
| 5,909,661 A | 6/1999 | Abramovitch et al. | |
| 5,917,784 A | 6/1999 | Supino et al. | 369/32 |
| 5,938,790 A | 8/1999 | Marrow | 714/795 |
| 5,946,156 A | 8/1999 | Schwarz et al. | |
| 5,946,158 A | 8/1999 | Nazarian et al. | 360/77.04 |
| 5,949,603 A | 9/1999 | Brown et al. | |
| 5,949,605 A | 9/1999 | Lee et al. | |
| 5,961,658 A | 10/1999 | Reed et al. | |
| 6,014,768 A * | 1/2000 | Lee et al. | 714/795 |
| 6,181,493 B1 * | 1/2001 | Wakefield | 360/31 |

OTHER PUBLICATIONS

IBM Research, "The Giant Magnetoresistive Head: A Giant Leap for IBM Research," http://www.research.ibm.com/research/gmr.html, pp. 1–2, Aug. 21, 1998.

G. F. Franklin, et al., "Design of a Disk Drive Servo: A Case Study," Digital Control of Dynamic Systems $3^{rd}$ Edition, pp. 649–689, 1998.

E. Grochowski, et al., "Future Trends In Hard Disk Drives," IEEE Transactions on Magnetics, vol. 32, pp. 1850–1854, 1996.

S. E. Baek, "Design of a Multi–Rate Estimator And Its Application to a Disk Drive Servo System," Proc. Amer. Contr. Conf., San Diego, CA, pp. 3640–3644, Jun. 1999.

X. Hu, et al., "Discrete–Time LQG/LTR Dual–Stage Controller Design And Implementation For High Track Density HDDs," Proc. Amer. Contr. Conf., San Diego, CA, pp. 4111–4115, Jun. 1999.

S. Hara, et al., "Two–Degree–of–Freedom Controllers For Hard Disk Drives With Novel Reference Signal Generation," Proc. Amer. Contr. Conf., San Diego, CA, pp. 4132–4136, Jun. 1999.

M. T. White, et al., "Rejection of Disk Drive Vibration And Shock Disturbances With a Disturbance Observer," Proc. Amer. Contr. Conf., San Diego, CA, pp. 4127–4131, Jun. 1999.

D. Hernandez, "Dual–Stage Track–Following Servo Design For Hard Disk Drives," Proc. Amer. Contr. Conf., San Diego, CA, pp. 4116–4121, Jun. 1999.

J. Li, et al., "Rejection of Repeatable And Non–Repeatable Disturbances For Disk Drive Actuators," Proc. Amer. Contr. Conf., San Diego, CA, pp. 3615–3619, Jun. 1999.

Y. Huang, et al., "Robustness Analysis on a High Bandwidth Disk Drive Servo System With an Instrumental Suspension," Proc. Amer. Contr. Conf., San Diego, CA, pp. 3620–3624, Jun. 1999.

Y. Huang, et al., "A Novel Disturbance Observer Design For Magnetic Hard Drive Servo System With a Rotary Actuator," IEEE Transactions on Magnetics, vol. 34, No. 4, pp. 1892–1894, Jul. 1998.

Y. Mizoshita, et al., "Vibration Minimized Access Control For Disk Drives," IEEE Transactions on Magnetics, vol. 32, No. 3, pp. 1793–1798, May 1996.

L. S. Fan, et al., "Magnetic Recording Head Positioning at Very High Track Densities Using a Microactuator–Based, Two–Stage Servo System," IEEE Transactions on Industrial Electronics, vol. 42, No. 3, pp. 222–233, Jun. 1995.

W. Guo, et al., "A High Bandwidth Piezoelectric Suspension For High Track Density Magnetic Data Storage Devices," IEEE Transactions on Magnetics, vol. 34, No. 4, pp. 1907–1909, Jul. 1998.

S. Koganezawa, et al., "Dual–Stage Actuator System For Magnetic Disk Drives Using a Shear Mode Piezoelectric Microactuator," IEEE Transactions on Magnetics, vol. 35, No. 2, pp. 988–992, Mar. 1999.

K. Mori, et al., "A Dual–Stage Magnetic Disk Drive Actuator Using a Piezoelectric Device For a High Track Density," IEEE Transactions on Magnetics, vol. 27, No. 6, pp. 5298–5300, Nov. 1991.

K. K. Chew, "Control System Challenges to High Track Density Magnetic Disk Storage," IEEE Transactions on Magnetics, vol. 32, No. 3, pp. 1799–1804, May 1996.

L. Guo, "Reducing The Manufacturing Costs Associated With Hard Disk Drives—A New Disturbance Rejection Control Scheme," IEEE/ASME Transactions on Mechatronics, vol. 2, No. 2, pp. 77–85, Jun. 1997.

S. Finch, et al., "Headerless Disk Formatting: Making Room For More Data," Data Storage, pp. 51–54, Apr. 1997.

S. R. Hetzler, "No–ID Sector Format," IBM Storage, pp. 1–3 Jan. 8, 1996.

* cited by examiner

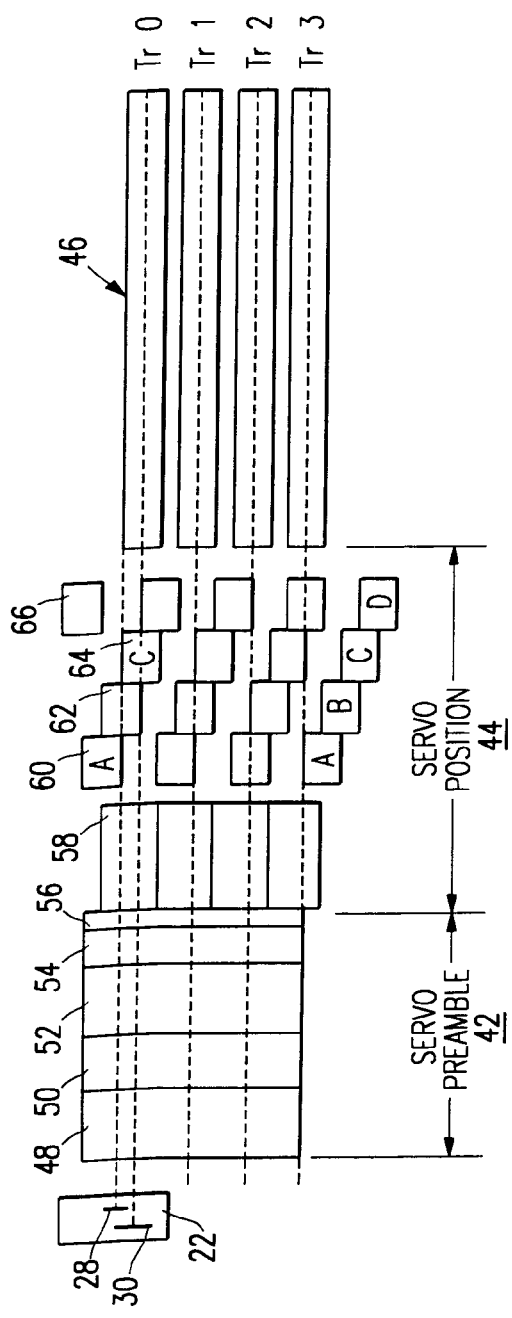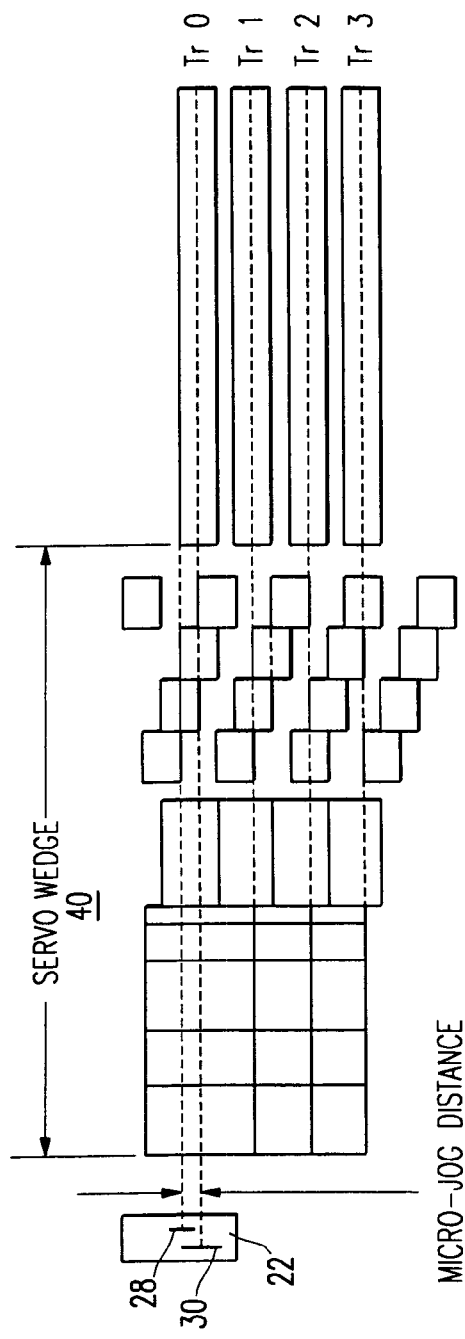
FIG. 9A (WRITING)
FIG. 9B (READING)

READ CHANNEL GENERATING ABSOLUTE VALUE SERVO SIGNAL

BACKGROUND OF THE INVENTION

1. Field of the Invention

The present invention relates to control systems and methods and more particularly to control systems and methods useful where a system characteristic observed for control purposes can take values of the same sign and magnitude for both positive and negative variations of a variable that is adjusted to control the system. While aspects of this invention are believed to relate very generally to many different control systems and methods, aspects of the invention find their most immediate application to the positional control of detectors used in data acquisition systems. Specific embodiments of the invention are useful in servo mechanical control systems such as high density magnetic disk drives from which data are read by precisely positioning a magnetic read element adjacent to a set of predefined data storage locations.

2. Discussion of the Related Art

The related art is illustrated with reference to several simple control systems. A common task assigned to control systems is maintaining the relative position of one object with respect to another object, where both objects may be moving in an unpredictable manner. One useful system to consider is an optical disk player, schematically illustrated in FIG. 1, of the type that focuses laser light from a laser 1 on a data storage surface 2 of an optical disk to read out data from the disk. Typically the laser light diverges and is focused on the data storage surface 2 by objective lens 3. During operation, the disk may flex or vibrate so that the distance between the data storage surface 2 and the focal point of the objective lens 3 changes by enough to measurably degrade the focus of the laser light on the surface of the optical disk being read. To prevent signal variations and degradation, the disk player adjusts the position of the lens to maintain the separation between lens 3 and the data storage surface 2 near constant at the nominal "in focus" distance. Here and throughout the discussion of the background and the invention, the term nominal has its customary meaning as satisfactory or according to plan.

It is not typically practical to measure the distance between the lens 3 and the data storage system, so disk players indirectly observe this distance. For example, light reflected from the data storage surface may pass through a beam splitter 4, be collected and refocused by lens 5 and directed to an optical detector 6. The optical detector 6 is divided into four quadrants, as illustrated in FIG. 2. The system is designed so that, when the distance between the lens 3 and the data storage surface 2 is equal to the nominal "in focus" distance, the light incident on the detector 6 is in focus and has an intensity distribution that varies symmetrically on the surface of the detector. Such a symmetric, "in focus" state is illustrated in FIG. 3. Each quadrant of the detector provides a separate output voltage $V_A$, $V_B$, $V_C$, $V_D$, so the symmetric state of FIG. 3 is associated with an effectively zero value of the observable quantity $(V_A+V_D)-(V_B+V_C)$.

Asymmetry is introduced into the laser light used to read the data storage surface 2 so that too short of a separation between the lens 3 and the data storage surface 2 produces an asymmetric, out of focus pattern on the detector 6 like that illustrated in FIG. 2. This asymmetry is characterized by high intensity light on quadrants B and C of detector 6 and low intensity light on quadrants A and D. Too long a separation between the lens 3 and the data storage surface 2 produces the out of focus pattern shown in FIG. 4, which is characterized by high intensity light on quadrants A and D of detector 6 and low intensity light on quadrants B and C. The amount of the asymmetry varies with the amount by which the separation between the lens 3 and the data storage surface 2 varies from its desired "in focus" distance. Consequently, the quantity $(V_A+V_D)-(V_B+V_C)$ can be a useful variable to observe to control the position of the lens 3. For example, a linear control system can be provided to adjust the lateral position of the lens 3 to provide good control of the focus of the optical disk system of FIG. 1 using the quantity $(V_A+V_D)-(V_B+V_C)$ as an input.

In the FIG. 1 system, the quantity $(V_A+V_D)-(V_B+V_C)$ provides a good observable variable for controlling the position of lens 3 (the controlled variable) and hence the focus of the system. $(V_A+V_D)-(V_B+V_C)$ provides both a magnitude indicative of the extent of the necessary correction and the sign of the necessary correction. The sign of the necessary correction indicates whether the lens 3 is too close or too far away from the data storage surface 2 and so which lateral direction the lens 3 needs to be moved to optimize focus. $(V_A+V_D)-(V_B+V_C)$ can be used to control the FIG. 1 system because (1) the laser light is purposefully made asymmetric within the system and (2) the detector is made up of four independent quadrant detectors. In other words, the optical system is especially adapted to allow for the easy control of the position of the lens 3.

While it is possible to control the system of FIG. 1 using the asymmetric beam in association with a quadrant detector, this is not an entirely desirable situation. It is easier to design optical systems for light that varies uniformly than it is to design similar quality optical systems for asymmetrically varying beams. This is particularly true when different colors of light might be used in the optical system.

Variations of the system of FIG. 1 that do not intentionally introduce asymmetry into the light beam could use a detector like that illustrated in FIG. 5, which includes an outer element 7 producing an intensity-dependent voltage output of $V_T$ and an inner element 9 producing an intensity-dependent voltage output of $V_C$. Using such a system, the quantity $V_C/(V_C+V_T)$, schematically illustrated as a function of lens to storage surface separation S from the nominal "in focus" position $S_O$, provides a measure of the focus of the system. It is possible to use this observable to adjust the focus of the system, but it is difficult. This is so because the quantity $V_C/(V_C+V_T)$ indicates a magnitude of a correction to be made, but does not provide a sign or direction for the correction. For any observed variation of the quantity $V_C/(V_C+V_T)$ from the peak, in focus value, the lens might need displacement in either a positive or a negative direction. It is thus difficult to directly control the FIG. 1 system using only the quantity $V_C/(V_C+V_T)$.

Systems like that indicated in FIG. 6 can be called absolute value systems, because the observed variable provides the absolute value of a correction to make, but does not indicate the sign or direction for the correction. For such absolute value systems, it is known to introduce a movement of known direction such as an oscillation to the controlled variable. This technique is known as dither or dithering. Using dither, a regular oscillation is introduced to the position of the lens 3, which introduces a regular variation in the observed quantity $V_C/(V_C+V_T)$. By comparing the phase of the oscillations in $V_C/(V_C+V_T)$ with the phase of the oscillations in the position of the lens 3, the control system can identify the direction of the correction to be made to the lens position. Consequently, dither allows for the mechanism illustrated in FIGS. 5 and 6 to be used to control the FIG. 1 optical disk player.

Dither has a variety of drawbacks. It is complex, requiring introduction of a detectable amount of motion between objects. Moreover, dither is itself a noise source, and so is generally undesirable. Consequently, it is more common to design a system to have an observable variable that provides both a magnitude and direction or sign for a correction than it is to use a system like that illustrated in FIGS. 5 and 6.

The above example relates to the control of the optics of an optical disk player and illustrates the difficulty of trying to control such a system using an absolute value observable variable. In this sense, an absolute value observable variable is one that varies with the variable to be controlled, but only in magnitude as illustrated by the graph of FIG. 6. A similar problem can be illustrated with reference to magnetic disk storage systems and this discussion now turns to that technology. This background discussion illustrates aspects of the problem to which aspects of the present invention are addressed as well as aspects of an environment in which particularly preferred aspects of the present invention are implemented.

Magnetic disk drive data storage systems provide high volume, long term data storage that is comparatively fast and relatively inexpensive, at least as measured on a per-bit basis. For example, magnetic disk storage is faster than present optical storage options and is comparatively less expensive than present flash memory based storage devices. Industry today relies on magnetic disk drives for long term data storage in various types of computer systems and in certain consumer electronics applications such as video recording and playback, and both types of uses continue to grow. Research into magnetic storage disk systems continues and the performance of such systems is expected to continue to improve.

Rotational storage devices and in particular disk drives store data on one or more faces of a rotating media, often referred to as platters or disks. In the case of a conventional hard disk drive, data are stored by generating a magnetic modulation within a magnetic material coated on a data storage surface of the disk. Data are read back by subsequently detecting this modulation with a read head. Typically data are written to a disk using a write element and data are read from the disk using a read element, where both the write and read elements are provided as physically distinct elements on a single head. By recording data in the form of magnetic signals on the rotating disk, data can both be stored and subsequently recovered after even long periods of time. Data may be organized into a plurality of radially displaced, tangentially extending tracks, with the data stored on the tracks generally organized into a plurality of data blocks. To read or write data from or to a particular data block, the typical disk drive positions the read and write head over the track containing the target data block in what is known as a seek operation. The read and write head of the disk drive then reads or writes the data on the storage surface, as desired. Data read and write operations, seek operations and other operations such as using Grey codes to identify track positions are described in U.S. Pat. Nos. 5,523,902, 5,796, 543, and 5,847,894, each of which is hereby incorporated by reference.

FIG. 7 illustrates schematically certain aspects of a storage surface 10 and of a disk drive. Generally, the disk 8 includes a central opening 12 through which passes the spindle of the disk drive and by which the disk and its storage surface are rotated. An area 14 is provided on the disk around the central opening 12 for clamping or otherwise holding the disk to the spindle; this area 14 is essentially unusable for storage. The storage surface 10 extends radially away from the clamping area 14 and may terminate in a peripheral band of the disk, not shown, that is also preferably not used for data storage. In general, the storage surfaces of disk drives may be considered substantially uniform or the storage surface might be divided into plural zones. When the storage surface 10 is treated as substantially uniform, relatively little is done in the disk drive to account for the differences between radially displaced data storage locations such as differing rotational velocities and the associated differences in the areal density of stored data on the disk surface. Another strategy subdivides the storage surface 10 into a number of radially extending bands, known as zones, such as the zones 16, 18 and 20 indicated on the storage surface 10. The various storage locations within the different zones 16, 18 and 20 are treated similarly, while the storage locations in different zones may be treated differently, for example by using different clock rates for reading or writing different signals or by using different densities of servo information.

The read and write head 22 is a small assembly provided on the end of an arm or transducer assembly 24 that moves the head 22 over the storage surface 10. The transducer assembly may move the head 22 by rotation, by translation or by a combination of rotations and translations. For example, many present drives provide larger movements by rotating the transducer assembly about a pivot on the end of the transducer assembly opposite that of the head 22. Additional adjustments may be accomplished using fine translations, which might be accomplished, for example, using piezo-electric elements. In general, the mechanical rotational and translational movements of the head 22 are preferably accomplished under servo control using, for example, voice coil motors or other compact, fast response systems. The read and write head 22 of the transducer assembly is typically not rigidly attached to the transducer assembly. Rather, the read and write head is preferably mounted on a slider coupled to the transducer assembly through a flexible assembly. Typically the slider is designed to "fly" on an air bearing over the data storage surface created between the shaped undercarriage of the slider and the disk.

FIG. 8 illustrates in greater detail aspects of one currently favored read and write head design. The illustrated read and write head 22 is mounted on one end of a slider 26 that is, in turn, mounted to the transducer assembly (not shown in FIG. 8). A magnetoresistive read element 28 is formed as a thin film element near or on the end surface of the slider and then an inductive or other type of write element 30 is provided partially over the read element 28. A protective coating 32 covers the read and write head 22. As illustrated, it is typical that the write element 30 is considerably larger (sometimes 160% or more) than the read element 28. In addition, the read element 28 is typically offset to one side with respect to the write element. This configuration is characteristic of the illustrated types of elements and causes the read and write head to have different preferred positions with respect to a track or other data storage structure for respective read and write operations.

A read and write head 22 associated with a storage surface is precisely positioned with respect to data storage locations along a track through the use of servo control mechanisms within the disk drive that operate in conjunction with positional servo information stored on the storage surface of the disk drive. Various servo schemes have been used historically for magnetic storage disk drives, with the industry presently preferring the use of servo information included on each data storage surface on the disks within the disk drive. In reliably performing a track seeking operation, the disk drive uses the read element 28 of the head to detect servo position information that is used by control circuitry to position the transducer assembly and the head over the target track. The servo position information identifies the position of each track and provides at least a relative identification for each of the tracks on the disk drive.

Positional control or servo information most often is stored within radially extending sector servo wedges, described in greater detail in the above-referenced patents, precisely placed on the disk's data storage surface during the original manufacture of the disk storage device. The positional and other servo information may be written with a servo writer like that described in U.S. Pat. No. 4,920,442 or in accordance with the methods described therein. Servo writers are used in a factory initialization process to write positional and other servo information on the storage surfaces of the disks, along with other information to prepare the storage surface for use. The servo writer, typically using precise positional information provided by a laser positioning mechanism, most often places servo information on each track along predefined radial spokes, defining the beginning of each sector on the disk.

FIG. 7 shows two possible organizations of servo information on the storage surface of a disk 8, the one discussed above in which full radial wedges 34 extend over the usable radial extent of the data storage surface 10 and another in which partial servo wedges 36 are provided in different densities in different zones of a storage surface. In the first method there may be on the order of 100–200 servo bursts positioned at regular angular intervals on the storage surface of a 3.5" storage disk. Different designs and operational parameters can change these characteristics significantly. In the second of the methods, there is an increasing number of servo wedges in each of the zones as they progress away from the center of the disk. Generally, only one of the two schematically illustrated methods is used on a disk.

Regardless of whether zones are differentiated on the data storage surface, the servo wedges may include a significant amount of information useful for positioning the head and for reading and writing data to the disk. An illustration of the information that may be included in the servo wedge is provided, for example, in previously incorporated by reference U.S. Pat. No. 5,796,543 and is reproduced in FIGS. 9A & 9B, which respectively illustrate writing and reading operations. These figures show a portion of a servo wedge 40 where it extends across four data tracks Tr 0, Tr 1, Tr 2 and Tr 3. The wedge 40 is made up of a servo preamble 42 and servo position information 44 and the wedge is followed by one or more data blocks 46 in each of the tracks. A head 22 including both read and write elements is shown to indicate the procession of data (leftward) by the head and the preferred position of the head with respect to the centerline of the track during writing (FIG. 9A) and reading (FIG. 9B) operations. As shown, the read element is typically maintained off the center line by a predetermined displacement during a write operation. Because of this, the preferred track following position is sometimes off the centerline of the track.

The servo preamble 42 provides information used to adjust the read channel electronics for reading and processing the positional servo information. The servo position portion 44 of the servo wedge provides the actual position data to be read by the read element 28 and used for positioning the head 22. The illustrated servo preamble 42 begins with a pre-burst gap 48 in which no transitions are recorded followed by an automatic gain control (AGC) field 50 that might include a regular pattern of transitions (e.g., a positive 3T pattern followed by a negative 3T pattern) used to adjust the gain of the read channel electronics. The servo preamble next includes a sync pattern 52 for setting the clock in the read channel electronics when reading the servo positional information, which may be followed by a servo address mark 54 that indicates to the read channel electronics that the subsequent information will be servo positional information, as opposed to data. Next the servo preamble 42 may include an index field 56 that provides positional information within the track, i.e., whether the servo wedge is that designated as the first servo wedge on the track.

After the servo preamble 42 is the servo position information 44, including coarse position information 58 and fine position information 60–66. The coarse position information 58 may, for example, comprise Grey codes that numerically designate each of the tracks on the storage-surface. Generally, a gap separates the coarse position information 58 and the finer track positioning information provided by servo bursts 60–66. The checkerboard pattern 60–66 of offset servo bursts A, B, C, D of recorded information are written to have precise and desired positions with respect to the centerlines of different tracks within a predetermined grouping of tracks. This allows the read element to generate a control signal related to the linear offset with respect to a desired position relative to a track, such as the track centerline, which control signal can be used to adjust the position of the head with respect to the track.

The illustrated checkerboard pattern consisting of the A, B, C, D servo bursts is formed by a servo writer using multiple write and erase passes during manufacture so that each of the servo wedges includes the illustrated pattern of four rectangular servo bursts repeated at desired radial and tangential positions. The servo bursts A, B, C, D might internally consist, for example, of a repeating 3T pattern, with the servo bursts surrounded by regions without recorded transitions. In the normal operation of the disk drive, the boundaries of the servo bursts are detected in track seek and track following operations to periodically generate a position error signal (PES) that can be used to adjust the position of a head with respect to a data track. In between the servo bursts, multiple (typically 3–5) data blocks are stored along the track. The servo control mechanism works in cooperation with the buried servo information to place the head accurately at a desired position with respect to the track as the servo burst passes beneath the head. No additional positioning information is available until the next servo wedge passes by the head. Accordingly, the servo control mechanism attempts to hold the head in a fixed position with respect to the track position identified by the most recent servo burst. It is possible for the head or the disk to move due to mechanical impacts, vibrations, thermal variances or other disturbances in the system before reaching the next servo burst.

In addition to the track identification information within the servo wedge, storage surfaces are sometimes provided with additional information to indicate when the desired track and sector has been located in a seek operation. An ID header block may optionally be provided between the servo burst and the first data block of a sector. The ID header primarily includes identification for the track and the following sector. Aspects of the use of synchronization patterns and headers are described, for example, in U.S. Pat. Nos.

5,541,783 and 5,796,534, which patents are hereby incorporated by reference. While header information may be provided at the start of sectors in many systems, other techniques for identifying tracks that do not use headers are known. For example, ID and header information can be included within the servo bursts as described in the article by Finch, et al., "Headerless Disk Formatting: Making Room for More Data," *Data Storage* (April 1997), pp. 51–54, or servo information can cross-reference information stored in a corresponding table in memory as described in the IBM Storage publication by Hetzler, "No-ID Sector Format," dated Jan. 8, 1996.

Following a servo wedge 40 (and ID header block when used), multiple blocks of data (typically 3–5) can be stored along a track, as shown in FIG. 10O. Each block of data 70, 72, 74 includes a data synchronization pattern 76, 78, 80 positioned adjacent the data storage region of the block. Typically, a data block 70, 72, 74 is followed by an ECC block 82, 84 that stores error identifying and correcting codes for the preceding data block. The data storage region of each data block is typically of sufficient size to store data signals to represent 512 bytes of data.

The data synchronization pattern includes synchronization information that can be extracted to establish a sampling frequency and phase for recovering data from a data storage region. The conventional synchronization pattern 76, 78, 80 is written by the write element of a head in an operation in which the associated data block 70, 72, 74 is written. The clock rate used to write the synchronization pattern is also used to write the subsequent data blocks. During a subsequent read operation, the read element of a head passes over the synchronization pattern and detects a pattern of transitions (e.g., a 2T or 3T pattern) from which a clock is derived for reading the subsequent data blocks. Conventionally it is preferred that the synchronization pattern be substantially uniform in the radial direction, varying only in the tangential direction for a read element positioned in a desired manner with respect to the track. Typically, the disk control logic and the actual rotational speed of the disk determine the data rate written for the data synchronization pattern and the data storage region that follows. Accordingly, the actual data rate can vary from block to block and sector to sector and, consequently, the amount of space occupied by the stored data can change. To accommodate these changes, there is typically a gap (an interblock gap) or data pad 86, 88 following each data block to insure that there is sufficient physical separation between successive blocks along a track to allow data blocks to be written without overwriting a subsequent block header or trailing servo burst.

There is a tension in designing data storage systems between increasing the track density, which typically requires denser servo wedge patterns, and loss of storage area due to the provision of increased densities servo information. It is desirable to provide additional servo information without reducing the area on the data storage surface devoted to the actual storage of data. In other words, it is desirable to increase the storage density without increasing the overhead necessary for accurately storing and retrieving information.

FIG. 11 illustrates the differences between precise positional control during a write operation and poorer positional control during a write operation, such as might occur for a data block displaced away from a sector servo wedge when the disk is subject to vibration. The figure shows a data block within a well-written track 90 where the written data is symmetrically disposed about the centerline of the track. The write width of the track (TW) is symmetrically disposed within the pitch allowed for the track TP. For a well written track 90 such as is illustrated, a read head centered on a track senses a read area 92 positioned within the data stored on the track with good margins between the read area 92 and the edges of the written track area. The track arrangement might, for example, illustrate a track pitch TP of 1.0 $\mu$m, a write width TW of 0.8 $\mu$m, and a read width 92 of 0.6 $\mu$m.

In contrast to the well-written track 90, the badly-written track 94 is subject to poor positional control and mechanical disturbance. The path of the badly-written track varies within the track pitch in an irregular manner. It is possible for such an irregular write path to be sufficiently misaligned that the read width is partially off of the written area, as indicated at 94. Such a misalignment reduces the quality of the read out data and can lead to read errors. To avoid this problem, it is conventional to increase the size of the write width relative to the read width. A different error, indicated at 96 in FIG. 11, occurs when a write head becomes misaligned to a sufficient extent to overwrite the written area of an adjacent track. Such an error is extremely undesirable and is avoided by increasing the track pitch.

Each of the potential errors illustrated in FIG. 11 is conventionally addressed by increasing the spacing between structures within the track. Because of this, improvements in head positioning accuracy can be significant factors in improving the density of tracks and written information.

The preceding discussion has set forth aspects of the servo and other informational structures provided on magnetic disk drives and how this information is used. With this background established, the discussion now returns to control systems for magnetic storage disk drives and how different observable variables are used in such systems. Commonly, the position error signals (PES) that are observed for controlling the position of the read and write head with respect to the track position are derived dedicated servo patterns. In particular, fine positional control is effected by deriving PES from the A, B, C, D servo burst patterns illustrated in FIGS. 9A & 9B. The position error signals detected by translating the read head over the A, B, C, D servo burst patterns vary linearly about zero and so provide both the magnitude and the direction of corrections to be made to the position of the head. Here the detected position error signals are the observable variables that can be used for controlling the position of the head with respect to a data track. As discussed above with reference to FIGS. 10 and 11, however, control in accordance with the conventional servo information is not entirely sufficient to meet present and anticipated needs for magnetic storage systems. Alternate control strategies are desirable.

U.S. Pat. No. 5,233,487 to Christensen, et al., relates to magnetic disk drives and the control of head position with respect to a track using an absolute value observable variable for the control system. The Christensen patent describes a disk drive that periodically interrupts data reading and writing operations to perform a calibration of the optimal head offset with respect to a data track for data writing operations. The calibration proceeds by translating a read head across the track through a range of intentional misalignments with respect to the track. Data are read in the deliberately misaligned positions and the errors that occur in reading data from the track are obtained as a function of misaligned position. Error rates are derived by detecting blocks of data and then applying the standard data block error correction using the ECC circuitry of the disk drive with reference to the ECC data encoded with the data stored on the disk. The disk drive detects at what track position, and hence what level of intentional misalignment, that the observed error rate exceeds certain target error rates having a known association with known track positions. This allows the characteristics of the operating disk drive to be compared to known standards.

It should be noted that the target error rates (indicated in FIG. 2 of the Christensen patent) are absolute value functions. As such, the target error rates that are derived in the Christensen patent's system do not indicate the direction in which the head is misaligned with respect to the data track. The sign of the misalignment is known by the control system because of the intentional positioning of the read head, much in the same way that dither can be used to generate a known direction for a correction within an absolute value observable control system.

The track positions detected using the Christensen patent's method can be used to calculate a track center position, recalibrate the relative motion achieved by application of a controlled displacement voltage, and establish an optimal offset for reading data from and writing data to the track. In this way the Christensen patent performs a servo control function using information other than the servo wedge and servo burst information illustrated in FIGS. 9A & 9B. In particular, the Christensen patent performs servo control using error information derived from constraints associated with blocks of data stored on the disk. The Christensen patent's method, however, does not allow derivation of position error signals on a continuous basis or while data are being extracted from the magnetic storage disk.

The Christensen patent performs servo functions using an observable variable, a bit error rate derived from ECC operations on data blocks, that provides only absolute value information relating to the positional error. On the other hand, practice of the Christensen patent's method requires use of a head to track displacement that shares many problems with dithering and so cannot be used as data are gathered. It is desirable to provide a method and system capable of using absolute value information to perform a control function.

SUMMARY OF THE PREFERRED EMBODIMENTS

Aspects of the present invention can be used with or within a system and method for controlling at least one aspect of a system on the basis of an observable variable that either increases for both positive and negative variations about a nominal or target value or decreases for both positive and negative variations about the nominal or target value. Such an observable variable has the property that a value of the observable variable maps to two or more values of a variable representing the controlled aspect of the system. Such an observable variable is identified here as an absolute value variable and the system an absolute value system.

Aspects of the present invention provide an absolute value signal to an absolute value servo control system that can be used to control an absolute value system on the basis of an absolute value observable variable. An observed value of such an "absolute value" variable could correspond to either a positive or negative displacement of the controlled variable from its nominal value. The possibility of mapping the observed value to two different displacements makes it difficult to control an absolute value system. This is because the value of the observed variable does not indicate the direction in which the controlled variable should be adjusted to move the controlled variable closer to its nominal value.

Absolute value control systems and methods find particularly advantageous application in disk drive servo control systems where the object subject to positional control is the head of the disk drive. Most preferably the absolute value observable that is used in controlling the system is a signal derived from the data or data signals read from the storage surface of the disk within the hard disk drive. For example, the absolute value observable might represent error information characteristic of the data or data signals retrieved from the disk. In the alternative, the observable position error signal might be derived in accordance with a constraint characteristic of the data or data signals retrieved from the disk. Use of such an absolute value observable is particularly advantageous application in disk drives because such use allows the drives to perform servo operations such as track following on the basis of the data signals being read from the track.

Particularly preferred embodiments of the present invention receive signals from a disk drive and process them to provide an absolute value observable variable to be used by an absolute value control system. More particularly, embodiments of the present invention include a read channel chip that performs decoding of data recovered from a hard disk and as part of the decoding process generates an absolute value signal that can be used to perform servo operations on the disk drive.

Certain embodiments of the present invention provide a read channel circuit that develops error measures as the data signals from the disk are processed and decoded. Appropriate error measures may include the error measures developed by a slicer used in an adaptive equalization process. Other appropriate error measures may include those developed by the data decoder, which may be a Viterbi decoder, during the decoding of data signals from the disk. One or more of these error measures is provided to an output terminal of the read channel chip for use with an absolute value control system and method.

An embodiment of the present invention provides s read channel circuit for use with a data storage unit storing data signals according to an encoding scheme, the data storage unit characterized by a controlled variable, the read channel circuit for use with a control system operative with an observable variable having an absolute value functional relationship to the controlled variable. The read channel circuit comprises a signal line providing a signal stream representative of data stored on the data storage unit. A data estimation circuit assigns values to samples derived from the signal stream and assigning an error measure to the samples. A data output terminal outputs data at a data rate and a error measure output terminal outputs a signal representative of the error measure, wherein signals are provided concurrently on the data output terminal and the error measure output terminal.

The signals generated in this way may be used for servo operations in the following manner. A read channel chip in accordance with the invention generates a value of the absolute value observable variable. An control system, separate from the read channel chip, maps the value of the observed variable to the two possible displacements corresponding to the observed value. The control system prepares two estimators, with each estimator designed to predict the present or future state of the system based on a set of input values including the displacement. The first estimator takes one of the possible displacements as an input. The second estimator takes the other of the possible displacements as an input. Both of the estimators are used to predict values of the observed variable after the system has evolved through a time interval. The absolute values of the observable variables predicted by the estimators are compared to one or more newly observed values of the observable variable to determine which estimator embodies the proper assumption as to the sign or direction of the initial displacement. Control functions are preferably performed using the sign and displacement identified in this operation as being correct.

BRIEF DESCRIPTION OF THE DRAWINGS

These and other aspects of the present invention, along with various attendant benefits related to use and practice of these aspects, may be better understood with reference to the drawings, which form a part of the disclosure.

FIGS. 9A & 9B illustrate information stored within a sector servo wedge and the relationship between a head, the servo information and data tracks for write and read operations, respectively.

DETAILED DESCRIPTION OF THE PREFERRED EMBODIMENTS

Figure 1:
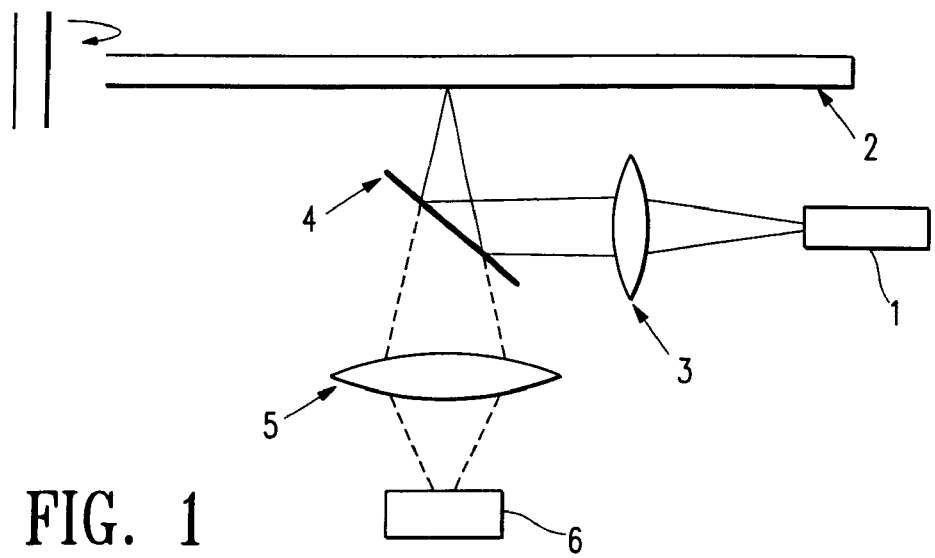
FIG. 1 illustrates aspects of an optical disk playback system.
Figure 2:
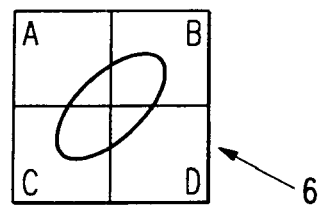
FIGS. 2–4 illustrate the use of an asymmetric beam in combination with a quadrant detector to generate an observable variable that provides both magnitude and sign for controlling the position of an objective lens within the system of FIG. 1.
Figure 3:
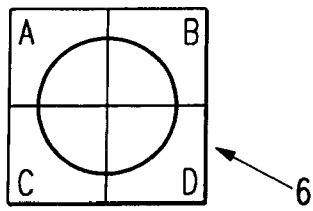
Figure 4:
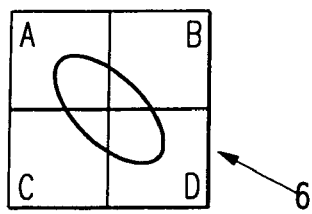

Aspects of the present invention can be used with or within a system and method for controlling at least one aspect of a system on the basis of an observable variable that either increases for both positive and negative variations about a nominal or target value or decreases for both positive and negative variations about the nominal or target value. Such an observable variable has the property that a value of the observable variable maps to two or more values of a variable representing the controlled aspect of the system. Such an observable variable is identified here as an absolute value variable and the system an absolute value system.

Particularly preferred embodiments of the present invention receive signals from a disk drive and process them to provide an absolute value observable variable to be used by an absolute value control system. More particularly, embodiments of the present invention include a read channel chip that performs decoding of data recovered from a hard disk and as part of the decoding process generates an absolute value signal that can be used to perform servo operations on the disk drive.

Certain embodiments of the present invention provide a read channel circuit that develops error measures as the data signals from the disk are processed and decoded. Appropriate error measures may include the error measures developed by a slicer used in an adaptive equalization process. Other appropriate error measures may include those developed by the data decoder, which may be a Viterbi decoder, during the decoding of data signals from the disk. One or more of these error measures is provided to an output terminal of the read channel chip for use with an absolute value control system and method.

The present invention operates within a control method, system and apparatus capable of controlling an absolute value system using an absolute value observable as an input variable. As used here, an absolute value observable variable is one in which the variable either increases or decreases for both positive and negative variations about a nominal or target value. A sufficiently large value of the absolute value observable variable indicates a displacement to be corrected, but could represent a positive displacement or a negative displacement. Control functions based on the observable variable preferably account for the lack of sign or direction indication for the correction to be made.

A very brief introduction is useful here to provide a working framework for illustration of aspects of the present invention.

Control systems incorporate models, whether implicit or explicit, of how the system being controlled reacts to input data. For example, most control systems for magnetic storage disk drives include an explicit model of the disk drive that predicts how the position of a read head changes in response to application of a certain voltage to an actuator. The disk drive control system determines how to position the head of the disk drive by predicting, i.e., calculating using a model of the disk drive and actuator response, how much voltage should be applied to the actuator to move the head to its desired position. The model uses the state of the disk drive such as the present position of the head as well as aspects of the history of the disk drive and receives input data about the changes to be made to the disk drive. From this information, the model within the control system of the disk drive predicts system behavior.

This discussion references estimators that can predict or estimate the future or present state of a system on the basis of a model of present or future system behavior. It is convenient to view an estimator as estimating or predicting a state of a system on the basis of a model of the system, the history of the system and the inputs to the system, but variations from this framework are possible. What are referred to in this discussion are, in the art, more precisely known as state estimators in that the estimator predicts various characteristics of a system that, taken together, accurately describe a system. Those of skill in the art of control theory will recognize that the term "observer" is sometimes used interchangeably with the term estimator. The following describes control logic that uses two slightly different estimators. For ease of understanding, it can be assumed that each estimator uses the same model of the system, the same input data representative of observed system behavior and, for the most part, the same prior history of the system. The two estimators each include slightly different presumptions about what has happened and what is happening in the system under control. By comparing the estimates of system behavior represented by these two estimators to the actually observed behavior of the system, the control logic can determine which of the two estimators included the more accurate description of the system. The control system can then adjust system characteristics on the basis of the estimated sign and displacement information.

Aspects of the invention are now illustrated through an example in which the variable to be controlled is the displacement of an object from its nominal target position and the observable variable represents a position error signal. Displacements can be positive or negative with respect to the nominal target position and the position error signal has the same sign for positive and negative displacements. A sufficiently large observed value of the position error signal indicates a displacement to be corrected, but could represent a positive displacement or a negative displacement. In other words, the position error signal has absolute value characteristics as a function of displacement. The position error signal may bear an asymmetric, nonlinear relationship to the displacement or may have a simpler relationship. Thus, any observed position error signal corresponds to two different possible displacements where the two displacements have different signs and might have different magnitudes. Systems with even more complicated mappings are possible and can be processed in a similar manner, typically by using additional estimators.

In accordance with aspects of the present invention, this exemplary system can be controlled on the basis of the observed position error signal using knowledge of the mapping between the position error signal and the displacement, in conjunction with a model of the system. The position error signal is observed at a first time interval. The first position error signal might correspond to a positive displacement +D1 or a negative displacement −D2 of the object with respect to its nominal position, so there is an ambiguity as to which direction to move the object to place the object at its nominal, target position. The control logic initiates a pair of estimators, one assuming that the positive displacement +D1 is accurate and the other assuming that the negative displacement −D2 is accurate. The two estimators predict the next position of the object at the next time interval. The estimators also predict values of the position error signal corresponding to predicted displacements. At the next time interval, the absolute value observed position error signal is detected and then compared to the absolute value of the corresponding position error signals predicted by the estimators. The comparison of the absolute values of the position error signals predicted by the estimators to the observed position error signal preferably identifies the estimator with the correctly assumed sign or direction of the displacement. Control operations then proceed using both the mapped magnitude and the estimated sign. Preferably the system resets the state of the other estimator after the sign is estimated.

Thus, the control system observes an initial position error signal corresponding to a displacement. The control logic keeps track of where the object would be if the initial displacement was positive (estimator 1) and keeps track of where the object would be if the initial displacement was negative (estimator 2). The estimators predict the displacement of the object under the different assumptions as to the sign of the initial displacement and predict the position error signal that would be observed for each of the different initial sign assumptions after the system evolves so that the object may be at a new displacement. The absolute value of the position error signal is later observed for the object and is compared with the corresponding absolute values of the position error signal predicted by the two estimators. The state estimator with the position error signal that is closer in absolute value to the measured absolute value position error signal is identified as the estimator with the correct sign or initial displacement. The comparison can be done repeatedly at subsequent time intervals until it is clear which of the two estimators is using the correct assumption about the sign of the initial displacement. Thus, after sufficient time, or a sufficient number of time intervals in a discrete system, one of the estimators will predict a position error signal sufficiently different in absolute value from the observed position error signal that the correct estimator can be selected with confidence. This provides the control system with sufficient information to adjust the object's position and control the system on the basis of an absolute value observable.

Figure 5:
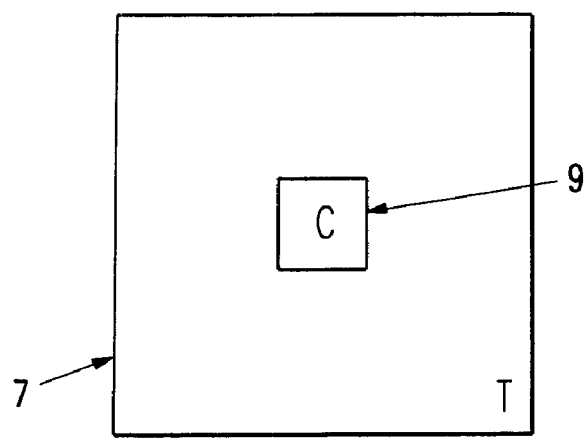
FIGS. 5 & 6 illustrate the problems associated with the use of a symmetric beam and symmetric detector for generating an appropriate observable variable to control the system of FIG. 1.
Figure 6:
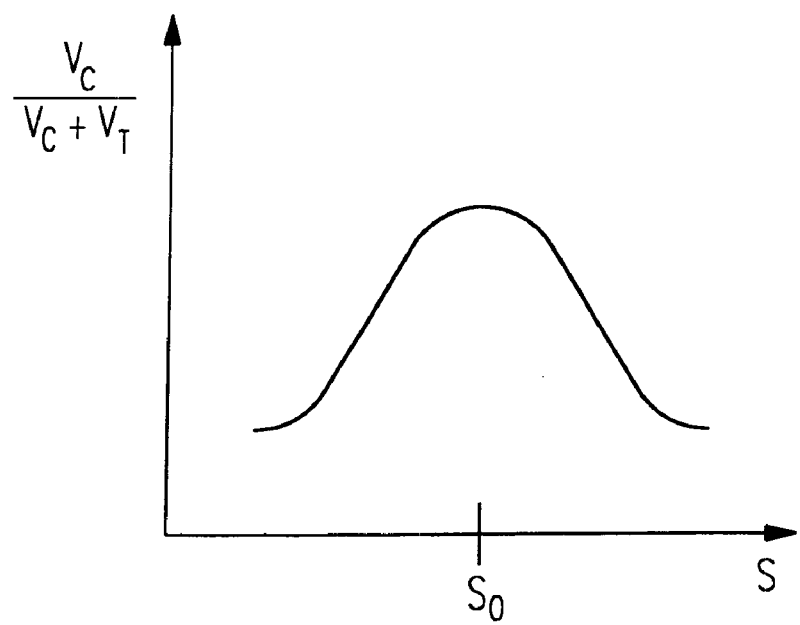
Figure 7:
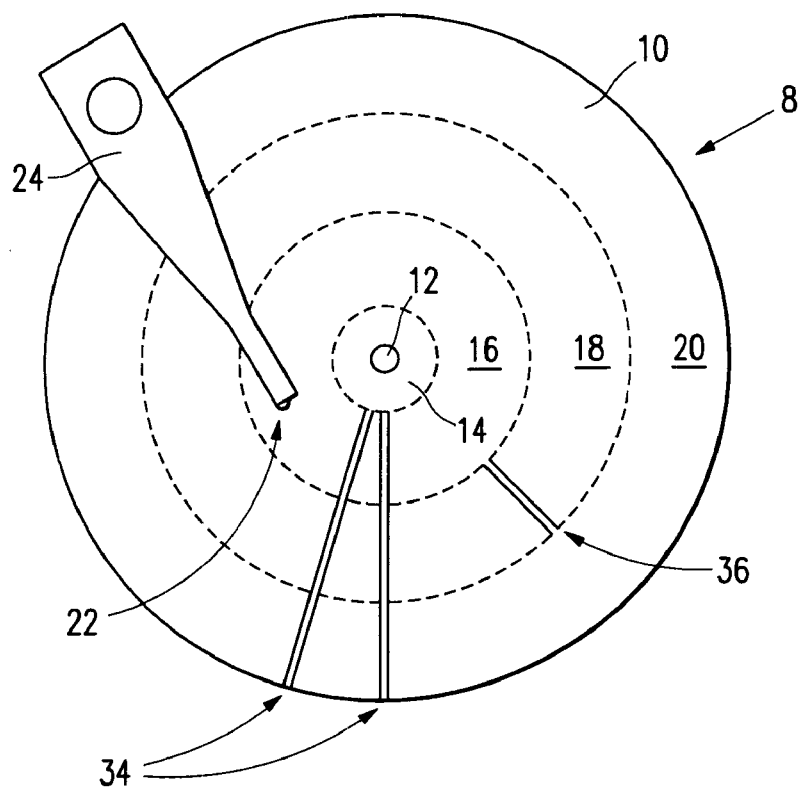
FIG. 7 schematically illustrates aspects of a magnetic disk drive, including a read and write head mounted on an arm and the data storage surface of a disk.
Figure 12A:
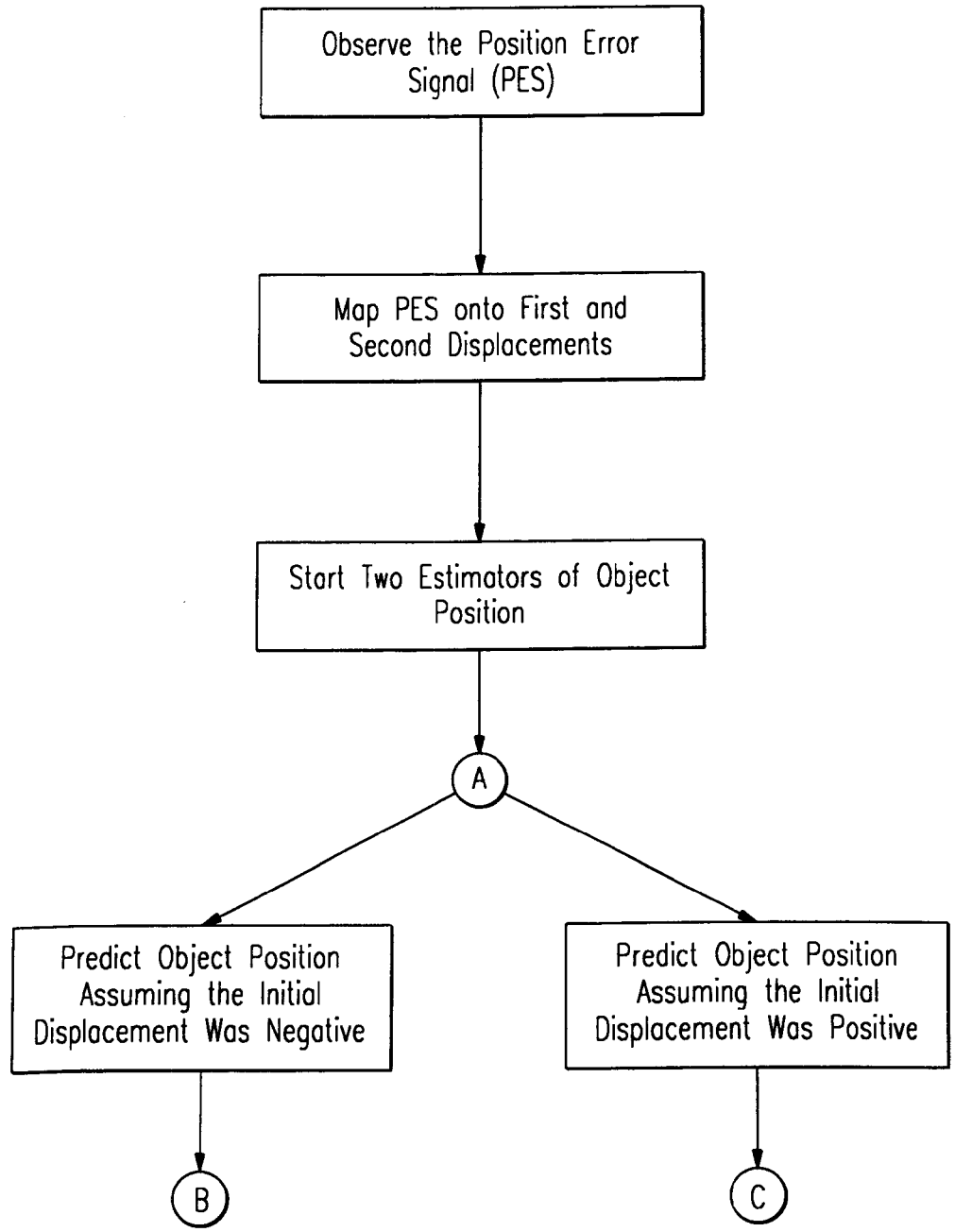
FIGS. 12A & 12B illustrate aspects of a method for identifying a proper correction to apply in response to an observed position error signal.
Figure 12B:
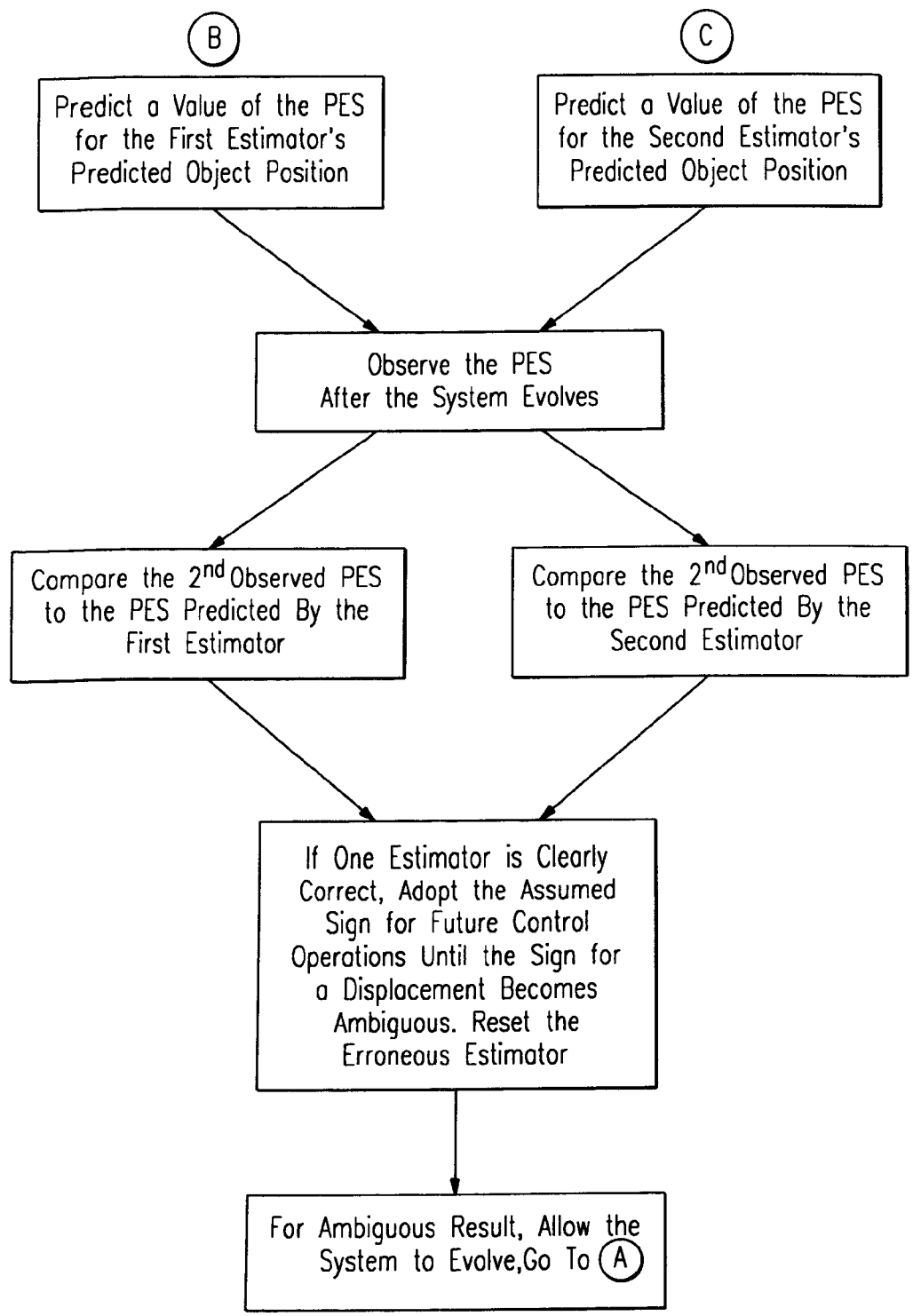

A schematic illustration of a process flow in accordance with the just-described method is provided in FIGS. 12A & 12B for reference. Application of this control method to an optical disk system such as that illustrated in FIGS. 1 & 5–6, that is one that provides an observable that has an absolute value functional relationship with the variable to be controlled, is readily apparent. The explanation of aspects of the invention to this point has been in fairly general terms, except that positional control of an object was assumed and aspects of a two-dimensional system have also been assumed. The invention might be applied in other embodiments including some in which the controlled variable is not a position and does not directly relate to a position.

The present inventors contemplate that the control method, system and apparatus described herein could be used in a variety of applications. Nevertheless, the control method, system and apparatus described herein were in fact developed for and have particular advantages when used in a magnetic disk drive system. Embodiments of the present invention may advantageously be used to control the position of a read and write head with respect to a predetermined position in or with respect to a track or other sets of data storage locations. Most preferably, these embodiments perform control functions at least in part using as an observable measure of the system to be controlled a signal derived from constraint or error information characteristic of data stored on the disk drive. Aspects of the present invention are described with particular reference to that intended and particularly advantageous environment.

It should be appreciated that the intended magnetic disk drive environment differs from the conventional magnetic disk drive systems that control head position primarily on the basis of servo information such as that illustrated in FIGS. 9A & 9B. The preferred magnetic disk drive embodiment provides a conventional, signed and linear, position error signal derived from the servo information stored in the sector servo wedges illustrated in FIGS. 9A & 9B. Control functions may be performed on the basis of position error signals derived from the observable information stored in servo wedges like those illustrated at A, B, C, D in FIGS. 9A & 9B. Control functions are preferably performed on the basis of observable information available at a rate significantly greater than the rate at which the servo wedge information is available.

The preferred operating environment derives position error signals in a more continuous manner than is conventional in a disk drive that uses servo information consisting only of servo burst patterns. Servo burst patterns of the illustrated type provide information no more often than once per data block and more typically every three to five data blocks. Most preferably, an appropriate disk drive system practicing aspects of the invention provides observable information about position error signals more frequently than once per data block. In particularly preferred embodiments, the observable position error signal might be derived from the data stored in a block or from the signals that represent that data and the position error signal is available at least several times during the time in which a data block is read from the disk. Most preferably, the additional position error information is available for observation as the data are read from the surface of the disk, so that the position of the head can be controlled during read operations.

Particularly preferred embodiments of the present invention derive a position error signal from the data stored on the disk, for example by evaluating errors in the data or deviations from constraints incorporated within the data. Such constraints, the derivation of error signals from data on the basis of constraints and other aspects of an appropriate and presently preferred operating environment are described in copending application Ser. No. 09/187,770, of Alvin M. Despain et al., "Apparatus For Developing A Dynamic Servo Signal From Data In A Magnetic Disc Drive And Method," filed on Nov. 6, 1998 and commonly assigned with the present application, which application is hereby incorporated by reference in its entirety. The Despain application describes a control system capable of performing control functions on the basis of error or constraint information derived from data signals of the type that might be stored on the storage surface of a disk.

Figure 13:
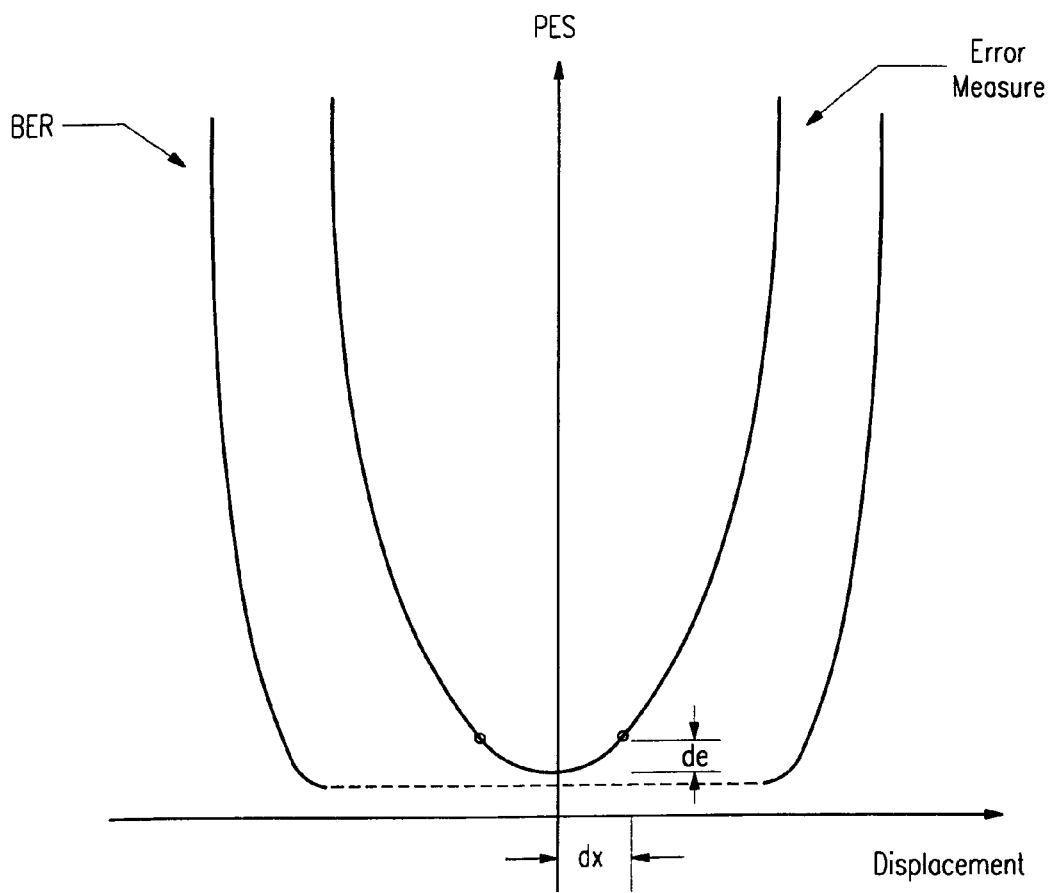
FIG. 13 schematically illustrates two different idealized error signals, each determined from data stored on the disk in accordance with a constraint within the stored data. Both of the illustrated error signals bear what is termed herein as an absolute value relationship to positive and negative displacements about a nominal position.

The Despain application describes positional control functions conducted at least partially using a position error signal representative of errors derived from data read from the disk. Two different position error signals, consistent with the teachings of the Despain application, each potentially capable of being used as an observed variable for controlling the position of a head of the disk drive, are shown in FIG. 13. Note that the illustrated curves are highly idealized. For example, the illustrated curves are illustrated as only slightly asymmetric with respect to the nominal track center. Empirical and theoretical data suggest that the curves are not generally symmetric and might be considerably less symmetric than is illustrated. The illustrated curves are also shown as monotonic. Empirical data to date has not shown the curves to be strictly monotonic, as noise signals can be significant enough to modulate the data in the manner illustrated in FIG. 14. The present inventors and the inventors listed on the Despain application have nevertheless been able to control both modeled and actual disk drives on the basis of non-idealized error information corresponding to the sort of data illustrated in FIG. 14.

It is important to note that the Despain application describes embodiments of a disk drive that use two read elements that together detect both a magnitude and a gradient of a position error signal. In effect the two read elements sense two different position error signals corresponding to two slightly different displacements, which allows a direct determination of the sign of a head to track displacement and knowledge of the direction the head needs to be moved to correct for the displacement. Because the two read elements provide a gradient of the position error signal that can indicate the sign or direction for a correction, the control method described here is not necessary to the operation of such two read element heads, although aspects of the present control method are nevertheless useful. Aspects of the present invention have greater advantage, for example, when gradient information is not available. Such a situation occurs when the head of a disk drive has a single read element and the observable variable has a functional relationship like those generally illustrated in FIG. 13.

The outermost curve, identified in FIG. 13 as "BER," shows a bit error rate ("BER") as a function of displacement from a nominal track center or optimum reading position on the track. The illustrated bit error rate is a position error signal that can be observed substantially continuously during data reading operations and can be derived from the data recovered from the disk sufficiently fast as to be used for a control system controlling the relative position of the head with respect to a data track. It should be appreciated that there are a number of different potential measures of the bit error rate and other functional relationships might be observed. The figure shows that the bit error rate varies as an absolute value function for positive and negative head displacements from the nominal track reading position. The figure also shows that the bit error rate is too small to be shown for small displacements and so might not presently be useful as an observable variable for a control system. For large displacements, however, the bit error rate is a strong function of displacement and can be used for those large displacements to control the head position.

Figure 8:
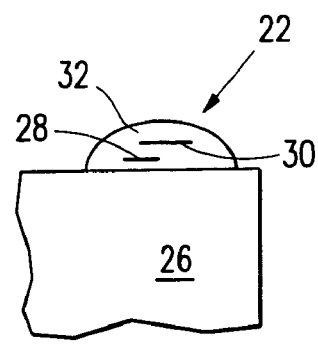
FIG. 8 illustrates aspects of read and write elements of a head.
Figure 11:
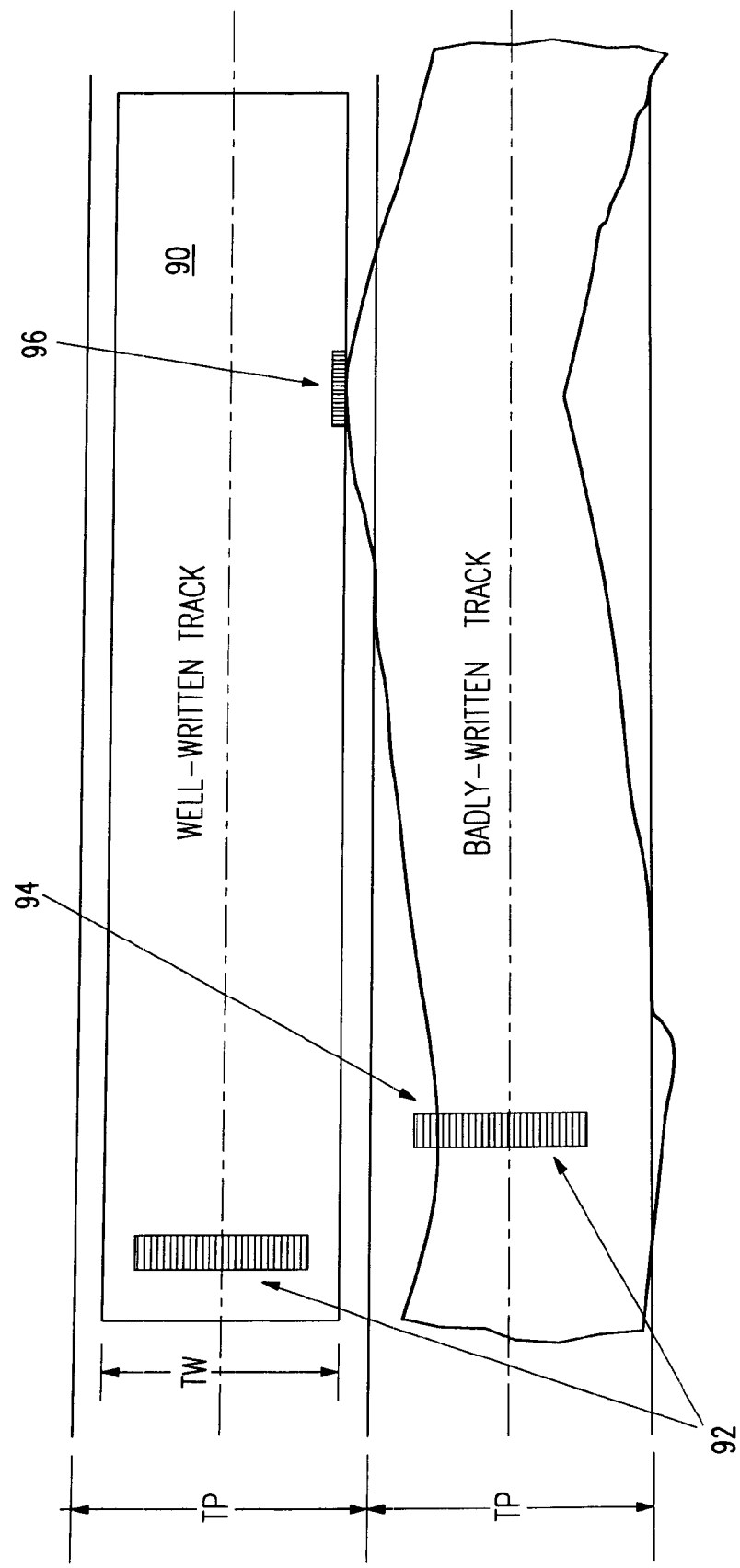
FIG. 11 schematically illustrates the spacing between tracks and a comparison between well-written and badly written tracks.

Study of the graphs of FIG. 13 suggests that the read head should be held at a nominal preferred reading position with respect to a track for reading data from the track with minimal errors. The asymmetry of the graphs, as well as the typical track margins allowed even for a well written track (shown in FIG. 11), make clear that the preferred track reading position need not be the center of a track. It is nevertheless convenient to discuss the preferred reading position as being the center of the track, as this convention is used frequently in the art. A desired position for reading data from a track might be referred to here as a nominal position or sometimes as occurring along the centerline of the track. This usage is intended to refer to a minimum error position with respect to the track, which naturally follows from practice of certain aspects of the present invention. It will also be appreciated from FIG. 8 and FIGS. 9A & 9B that the nominal head position for reading data is different from the nominal head position for writing data to a track.

Figure 14:
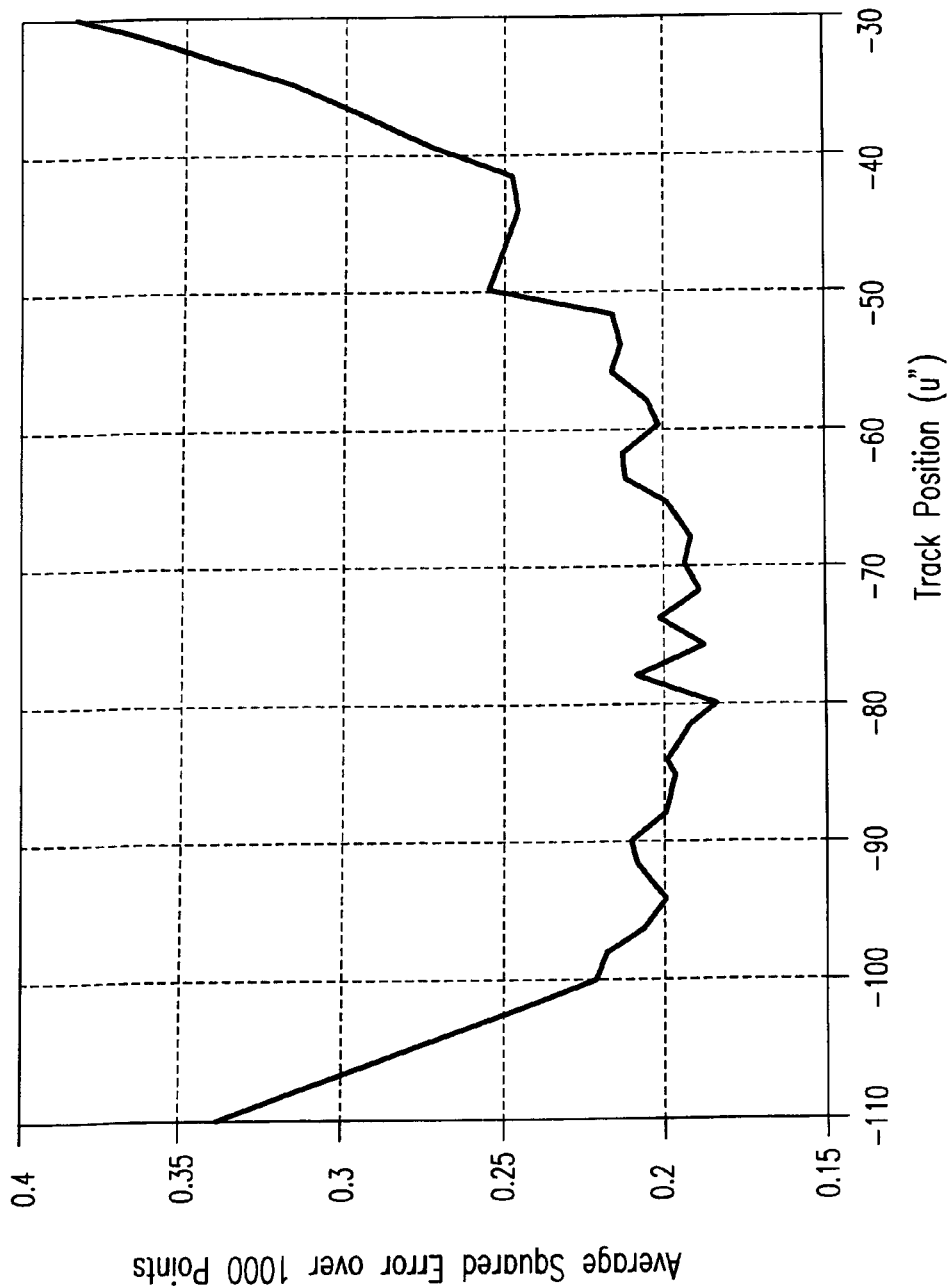
FIG. 14 illustrates empirical data that might correspond to an error signal derived from reading data from a data track with intentional misalignments between the head and the data track. The vertical axis represents an error signal times one thousand, the horizontal axis represents distances in microinches measured from an arbitrary origin with respect to a data track.

The inner curve designated as "error measure" in FIG. 13 is preferred in a control system according to the present invention, because even small displacements dx result in observable variations de in the error measure. The illustrated error measure might, for example, reflect an error derived from several measures of signal quality, channel quality or decoding accuracy generated within a Viterbi or other trellis type of decoder implementing a partial response maximum likelihood (PRML) decoding function. Derivation of this particularly advantageous type of position error signal is discussed in greater detail below. FIG. 14 illustrates a more realistic set of error observations than the idealized graphs of FIG. 13. The vertical axis indicates an average error over one thousand data points as a function of track position in microinches. The origin of the track position axis is set arbitrarily to one side. It should be noted that even though the illustrated graph is not simple, observations from the illustrated data set can be used as an input to the control system so long as the noise signals are properly accounted for by the control system in making decisions.

The bit error rate, such as that illustrated in the outer BER curve of FIG. 13, can be used as an observable position error signal for a control system to control the position of the head with respect to a data track. The other two error signals shown in FIGS. 13 & 14 can be used in the same manner. The illustrated position error signals bear a generalized absolute value functional relationship to the displacement of the head from its nominal position. As such, detection of a given value of the bit error rate may indicate a positive or negative displacement of the head with respect to its nominal optimum track reading position. Preferred embodiments of the present invention use the absolute value control method to discriminate between initial positive and negative head displacements for those situations in which the sign of a displacement corresponding to an observed position error signal is ambiguous.

Figure 23:
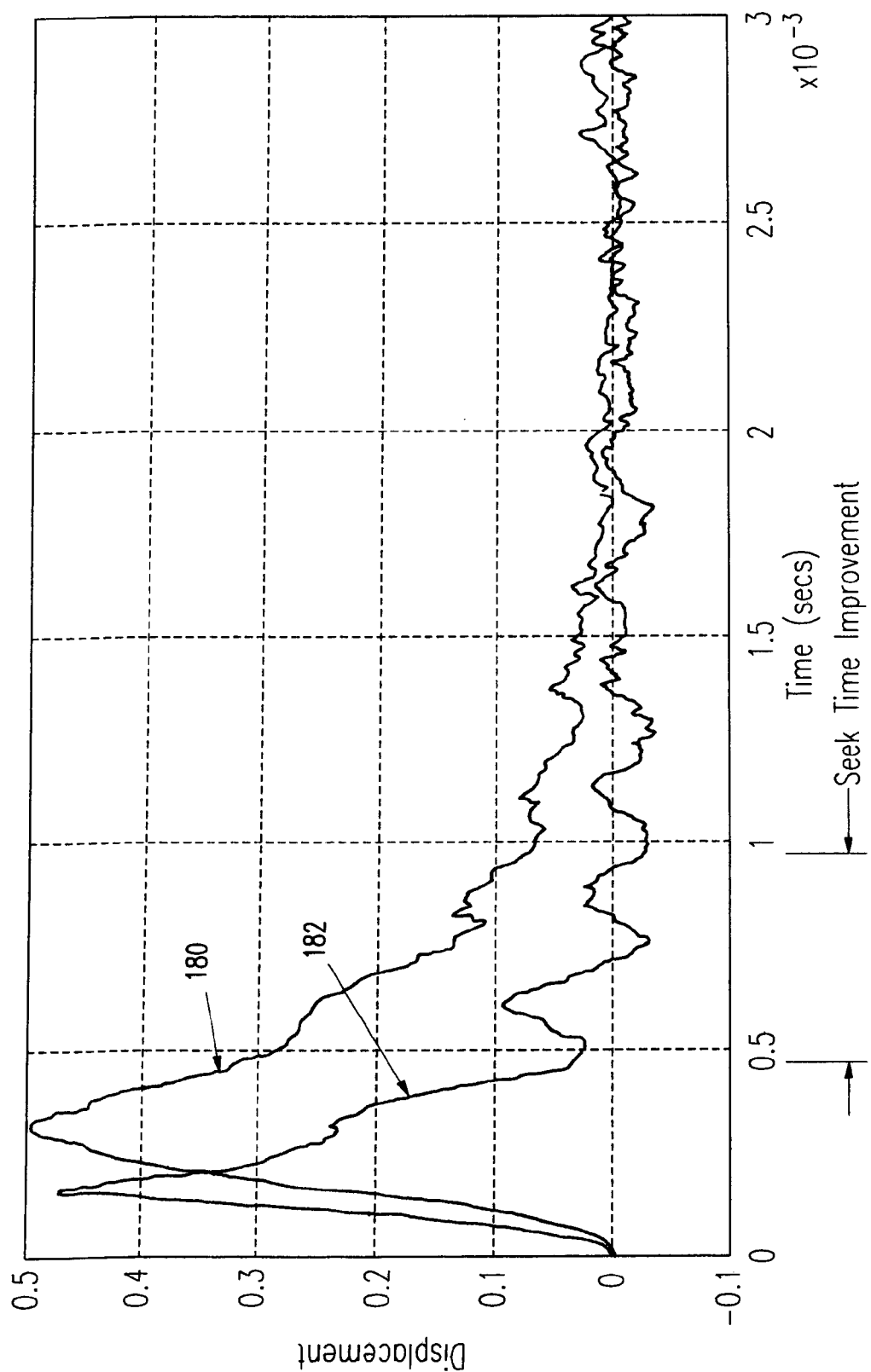
FIG. 23 shows as a function of time during and after a seek operation the position error signal with and without the estimated position error signal and control functions of an embodiment of the present invention.

There are a variety of head to track positioning operations to be controlled in a typical disk drive, including track seeking operations and track following during both read and write operations. Track seeking involves moving the head from a nominal reading or writing position with respect to one track to a nominal reading or writing position with respect to another track. Typically a track seeking operation is a relatively slow operation in which the head is moved across a number of tracks to reach the target track. Because of the way in which track seeks are presently practiced, the large displacement portions of track seeking operations are adequately controlled and facilitated by the servo information illustrated in FIGS. 9A & 9B. On the other hand, the absolute value control method is typically important in controlling the latter stages of track-seeking operations for present designs of disk drives. The absolute value control method is observed to significant improve settling times, as is illustrated in FIG. 23.

The absolute value control method finds application in track following operations and specifically in track following for read operations. Track following for a reading operation involves maintaining the head over the track being read and preferably holding the head at or near a particular position with respect to a nominal reading position. Conventionally this is done by setting the radial position of a head from the sector servo information and then trying to hold the head at that radial position while data are read from the three to five blocks typically positioned between servo wedges. Preferred embodiments of the present invention derive error or other information from the data stored on the disk and use that information to control the position of the head during the reading operation.

In accordance with particularly preferred implementations of the present invention, a preferred control system generates position error signals (PES) from data stored on the surface of a disk at a rate significantly higher than the rate at which conventional sector servo information is available. In certain presently commercially available systems, sector servo information is available at a rate of approximately 15 kHz. In a preferred implementation, the position error signal based on error or constraint information characteristic of the data might be generated at frequencies as high as 300 kHz. Of course, future systems might be expected to provide characteristic servo patterns and data derived servo patterns at different rates than are discussed here. Most preferably, this high frequency position error information is used together with the sector servo PES information, generated from sector servo wedges at a much lower frequency such as 15 kHz, to generate a position error signal. To do this, the control system is preferably adapted to respond to lower frequency position error signals bearing sign or directional information and higher frequency position error signals having absolute value characteristics that do not provide sign or directional information. Such a system might be used to control the hard disk drive system at a frequency intermediate between the lower frequency and the higher frequency position error signals, such as 60 kHz.

The availability of position error signals at considerably higher frequencies than conventionally derived position error signals facilitates a servo control system that generates more accurate actuator inputs that lead to faster response, smaller settling time and better disturbance rejection properties than those conventional control systems using only the lower frequency sector servo information derived from sector servo wedges that provide information at a conventional low rate such as 15 kHz.

The absolute value aspects of the control method in accordance with the present invention need not be active at all times while recovering data from a disk. In other words there are instances when the control system may know with good confidence the sign of a displacement that generates an observed position error signal. For example, there are many times when the past history of the head position and head movements provides an accurate indication of the present sign or direction of displacement. It is when the sign of the displacement is both needed and ambiguous that the absolute value aspects of the present invention are particularly useful. The higher rate at which position error signals are available in accordance with aspects of this invention is desirable whether the sign or direction of the displacement is known or not.

Figure 15:
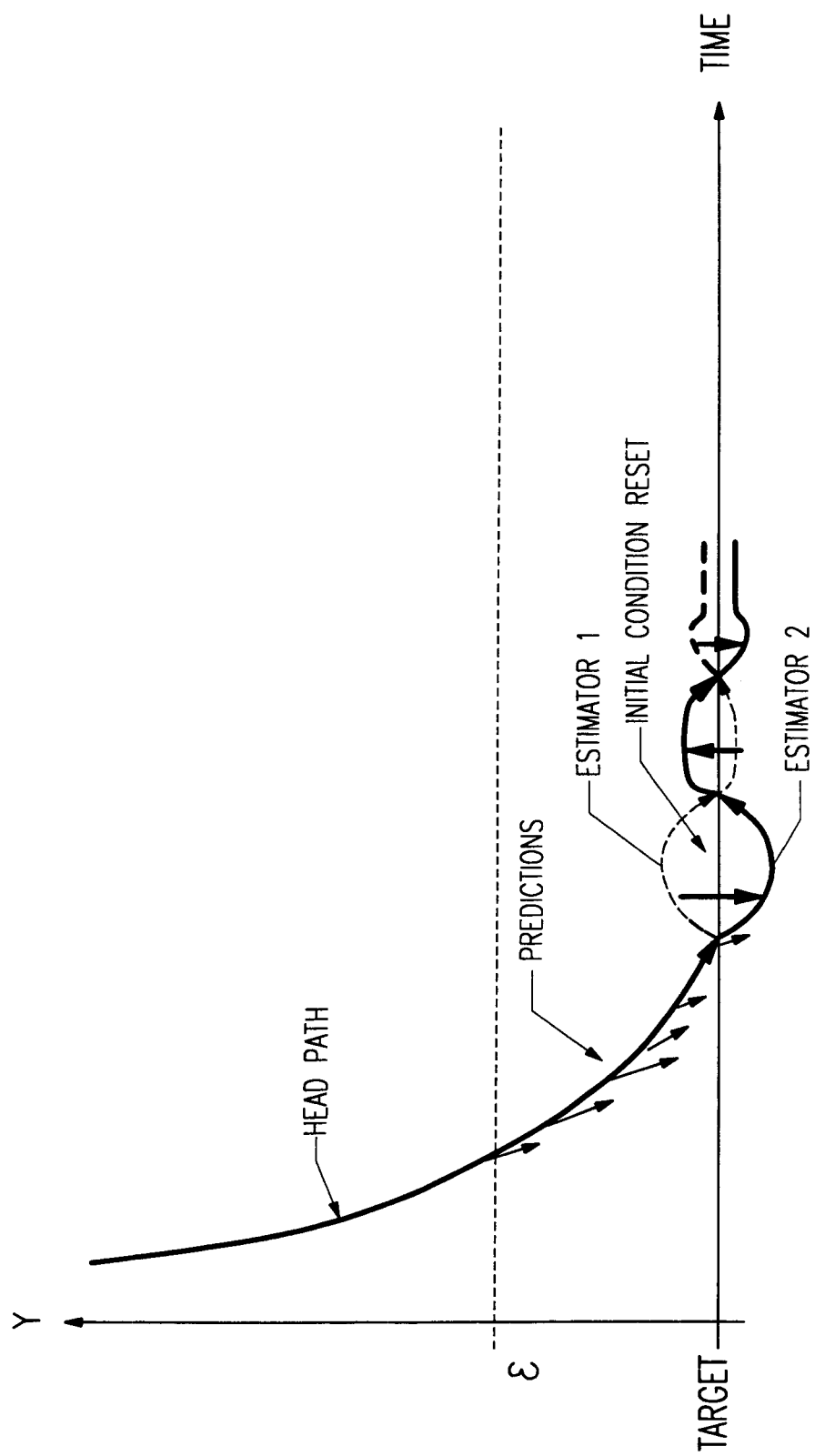
FIG. 15 schematically illustrates the path of a read head to and about a nominal position within a target track.

How the hard disk drive control system can have accurate information as to the direction of displacement of a read head is illustrated in FIG. 15, which shows schematically the path of a head being moved into position over the nominal target position within the target track. The nominal target position may correspond to the minimum of the "error measure" position error signal graph shown in FIG. 13, which is assumed to be the optimum position within a track for reading data. In the figure, the head path is indicated as a heavy black line, the target or nominal head position is indicated as the target position on the y-axis, and displacements from the nominal head position are indicated along the y-axis. For example, a displacement of $\epsilon$ in the positive direction is indicated along the y-axis. Negative displacements are also shown for the head as a function of time. Because the only head movement that matters is along the radial direction, that is all that is illustrated; radial positions are indicated as a function of time, which extends along the x-axis.

In the illustration of FIG. 15, the head is shown being moved toward the target track position from a large positive displacement. Up to the time at which the head comes within a distance of $\epsilon$ displaced from the target position, the control system can safely assume that the head will not be translated far enough in the next time interval to cross the target (e.g., centerline) position on the target track. Once the head is within a distance $\epsilon$ of the target (i.e., within $\pm\epsilon$ of the target) the control logic begins predicting the position where the head should be at the next time interval. Alternately, the control logic could predict the position of the head over other time intervals, such as constantly. As is discussed below, this prediction can be done by similar logic as is used for the absolute value and other aspects of the control system. $\epsilon$ is a design parameter for the control system and the hard disk system.

The control system keeps predicting the head position at successive time intervals. The control logic monitors the predictions of head position when the head is within the band of displacements extending to $\pm\epsilon$ about the target to determine whether the head is expected to cross the target position. So long as the head is not going to cross the target nominal track position, the control system can continue using the historically correct positive sign for the displacement. When the head is predicted to cross the target position, the control system assumes that the sign of the absolute value position error signal (such as the error measure of FIG. 13) becomes ambiguous. The control system initiates a first and second estimator once the sign of the displacement becomes ambiguous to predict the future sign or direction of the displacement of the head.

Each of the estimators embodies a model of the hard disk drive system that predicts the future head position on the basis of the prior state of the disk drive and input data corresponding to an assumption of the sign or direction of the displacement of the head at a next time interval. In the illustration estimator 2 includes the proper assumption about the sign or direction of the head at a next interval and so accurately predicts the actual path of the head. Estimator 1 predicts an incorrect position that is eventually conclusively identifiable as incorrect by the control system. After the control system decides that estimator 1 was incorrect, the state of estimator 1 is reset. The process of monitoring position continues, with the head moving about the target position and the estimator that is correct changing each time that the head crosses the nominal track reading position.

The dynamics of the estimators are based on accurate models of the system dynamics and are such that, if the actual signal was available at the same sampling rate as the absolute signal is, they would generate accurate estimates of the PES and of the system states. Different estimators are used depending on the system model available and its purpose. For instance, linear observers, nonlinear observers, Kalman filters, input/output prediction models such as ARMA (auto-regressive moving average) models, neural networks, fuzzy-logic systems, and the like can be used. Estimators can be implemented in software, whether in a general purpose processor or in the more specialized digital signal processor, in hardware, or in a combination of software and hardware. Different estimators are expected to be most appropriate for different systems to be controlled.

Control of the head position during track following and other head positioning operations is accomplished by control logic within an appropriate control system. To summarize, the control logic performs the following actions in translating a head to a track and, in some circumstances, in causing the head to follow a track:

If the value of the absolute value PES is larger than a certain level associated with a displacement of $\epsilon$ along the prior path, the control system assumes that the sign of the displacement has not changed since the last time interval. Control functions are performed by the control system in accordance with the displacement derived from the observed position error signal and the sign of the displacement at the prior time interval.

If the value of the absolute value PES is less than or equal to a certain level associated with a displacement of $\epsilon$ along the prior path and if the next step predicted displacement has the same sign as the displacement of the previous step, the control system assumes that the sign of the displacement has not changed. The predicted next displacement can be generated using linear or nonlinear interpolation between the last signal estimates. Other, more or less elaborate methods, including statistical methods, can be used to predict the next displacement. Control functions once again are performed by the control system in accordance with the displacement derived from the observed position error signal and the sign of the displacement at the prior time interval.

If the value of the absolute value PES is less than or equal to a certain level associated with a displacement of $\epsilon$ along the prior path and if the next step predicted value of the displacement has a sign opposite to the displacement of the previous step, then the sign of a subsequent displacement is estimated in the following manner. The control logic observes an absolute value position error signal, which maps onto first and second possible head displacements. The logic initiates first and second estimators that take as initial conditions the first and second possible values of the displacement. Displacements and corresponding position error signals are predicted. The control logic compares the position error signals predicted by the estimators to the measured position error signal to identify which estimator includes the correct sign of the displacement. Once the correct sign is estimated, the sign is used with the displacement to perform control functions. The state of the incorrect estimator is reset to that of the correct estimator.

Once the sign of the displacement has been estimated, the estimate of the signal is substantially equal to either the output of the estimator that corresponds to the estimated sign or to the input of the estimator. Whenever an estimate of the signal is made, the state of the estimator that correspond to the opposite of the estimated sign is reset or, in other words, set equal to the state of the estimator that corresponds to the estimated sign.

A more detailed description of aspects of a hard disk drive embodiment of the present invention is now presented. The particular embodiments are set forth to further illustrate implementations of specific aspects of the present invention. Numerous variations from the basic embodiments are known and could be implemented in accordance with preferred embodiments of the present invention. For example, the described embodiments do not utilize zones and provide sector servo information only every three to five data blocks. As discussed in the background and as is known in the art, variations from such embodiments are known, including disk drives that use zones and varying densities of sector servo information at different radii.

Figure 16:
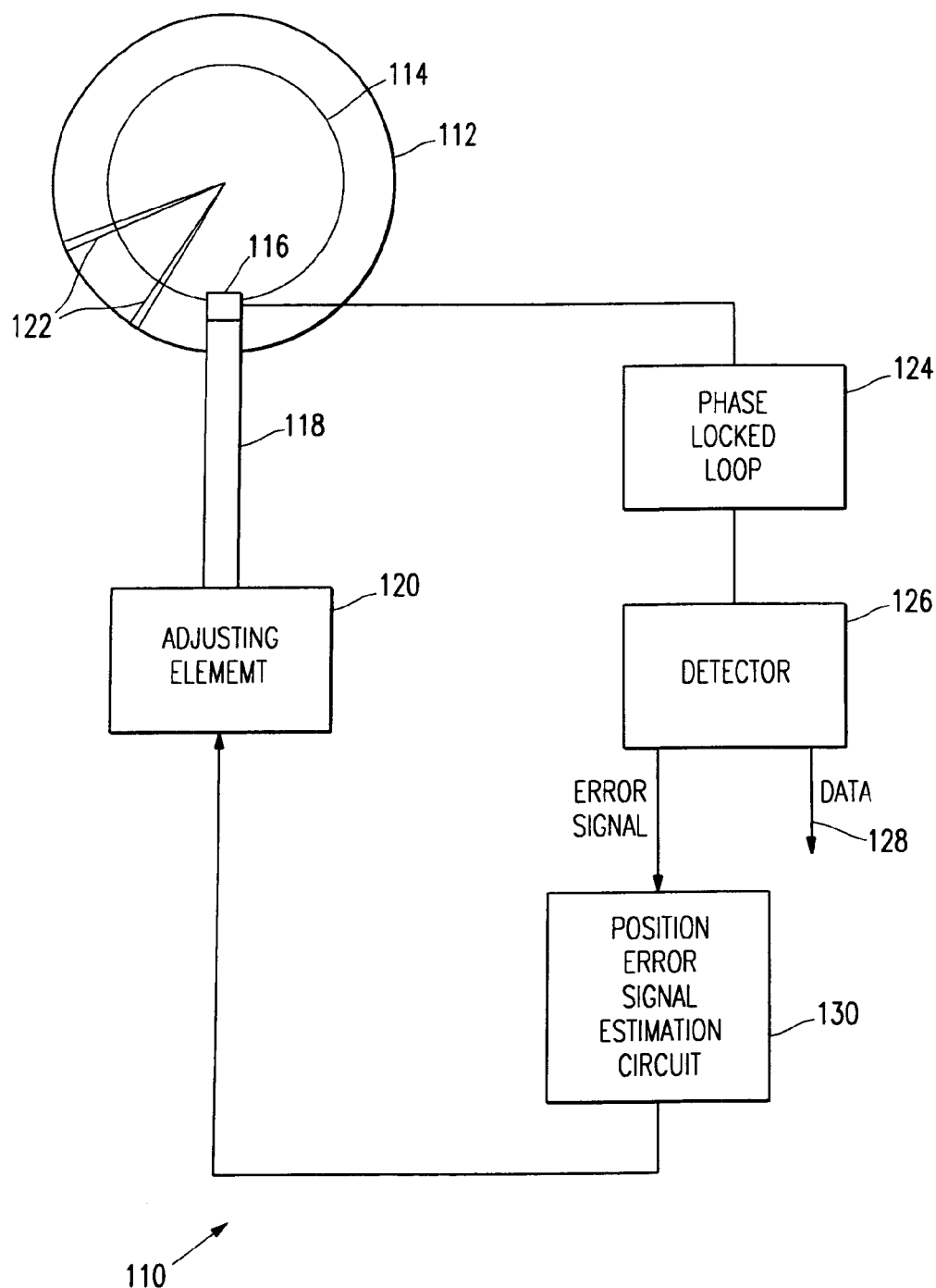
FIG. 16 is a simplified block diagram of a servo control system in accordance with the invention.

FIG. 16 is a simple block diagram of a hard disk drive incorporating a control system 110 in accordance with the present invention. The servo control system 110 is described in the context of a hard disk drive (HDD),system including at least one rotatable magnetic disk 112 on which data are stored in accordance with conventional disk drive technology. The disk 112 has a plurality of substantially concentric tracks 114, with only one of the tracks 114 being shown in FIG. 16 for simplicity. The track 114 is addressable by a read and write magnetic head 116 mounted at the end of a head loading arm assembly 118. The arm 118 moves the head laterally relative to the surface of the disk 112, primarily moving the head along a radial path and is adjustably positioned by an adjusting element or actuator 120.

Figure 10:
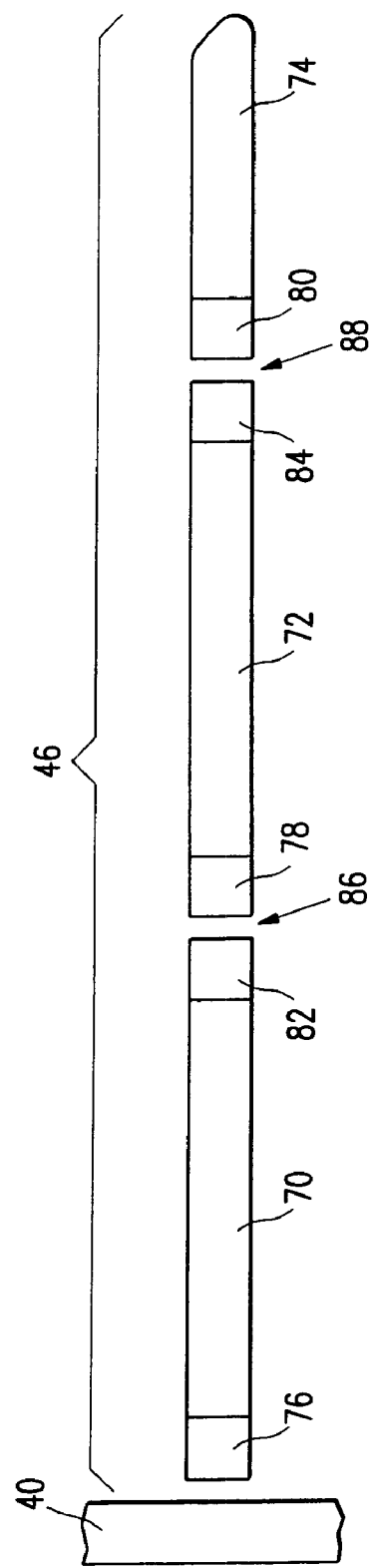
FIG. 10 illustrates aspects of the structure of data blocks within a track.

The disk 112 has a plurality of radially extending sector servo wedges 122 arranged in angularly-spaced-apart relation over the storage surface of the disk 112. Each of the sector servo wedges 122 provides servo information such as that illustrated in FIGS. 9A & 9B and described above. As the disk rotates relative to the head 116, the head 116 reads the sector servo information as the wedges 122 pass by. The head and the read channel of the disk drive circuitry derive a position error signal from the sector servo information that varies linearly with displacements from a nominal track position. The resulting position error signal provides both a magnitude and a sign or direction of the adjustment to be made to correct for the detected displacement. Between adjacent pairs of servo wedges 122, the head 116 reads data recorded along the track 114. Consequently, the signals sensed or read by the head 116 include both the servo information of the servo wedges 122 and the data recorded along the track 114 between the sector wedges 122. The general structure of the data blocks stored between the sector servo wedges is illustrated above in FIGS. 9 & 10 and described above with reference to those figures.

The signals detected by the head 116 are supplied to a phase locked loop 124 that detects and establishes the clock signal for sampling the signals from the disk at the appropriate clock rate. The output of the phase locked loop 124 is applied to a detector 126, which may also include a decoder. The detector 126 decodes the data signals read from the track 114 and provides the decoded data as an output 128. The detector 126 also processes the signals read from the track 114 to provide an error signal to a position error signal estimation circuit 130. The error signal may have characteristics like those illustrated in FIGS. 13 and 14 and may be generated as described in the Despain application identified and incorporated by reference above. The output of the position error signal estimation circuit 130 is preferably a control signal such as an analog voltage appropriate to adjust the position of the read head. The output of circuit 130 is applied to the adjusting element 120 to reposition the head/loading arm 118 and the included head 116 as necessary, so that the head 116 accurately tracks the track 114.

The magnetic disk 112 as well as the arm 118, the head 116, the adjusting element 120 and the phase locked loop 124 may be of conventional design. Most preferably the detector 126 incorporates modifications in accordance with the present invention to facilitate the use of that detector within preferred implementations of a control system. An acceptable detector is described in the Despain application and is described in further detail below. In accordance with the invention, the detector 126 and the position error signal estimation circuit 130 function to estimate the position error of the head 116 at a rate substantially greater than that which is conventional for hard disk drive control systems. It does this by determining the actual linear position error each time the servo burst within one of the servo wedges 122 is sensed by the head 116. In between the servo wedges 122, and as the head 116 reads the data along the track 114, values of the position error signals are derived and processed and are used to estimate values of the displacement to be corrected by the control system.

Typically, the data recorded along the track 114 are encoded in a particular format that places a constraint on the data stored by the system. In the present example, the data are encoded using PRML (partial response maximum likelihood), which is particularly prevalent in today's disk drive industry. The detector 126 includes an algorithm for decoding the data. The data as recorded on the disk has a repetitive timing pattern used by the phase locked loop 124 to establish a reference clock. This decoding and error signal generation process is like that described in the Despain application or like that described below with reference to FIG. 24.

In the present example, the rotational speed of the disk 112 and the spacing of the servo wedges 122 are such as to cause the servo bursts of the wedges 122 to pass the head 116 at a frequency of 15 kHz. Of course different rates will be characteristic of other system designs. Each time one of the servo wedges 122 passes the head 116, a linear signal of actual position error is generated. Both the magnitude and the sign of such signal are known because of the nature of the servo bursts recorded within the servo wedges 122.

Between the servo wedges 122, the head 116 samples tracking error data at a rate that is much higher than the rate of occurrence of the servo wedges 122 at the head 116. In the present example, the data rate might be 240 kHz, and can be even greater such as at a rate of 300 kHz where desired and as dictated by the requirements of the system. The timing is such that a position error signal is generated from the data within the track 114 at a rate which may be several or more times the rate of occurrence of the position error signals produced by the detecting the servo bursts within the servo wedges 122. Thus, for every string of four position error signals, one is produced by a sector 122 and the other three might be produced by the data recorded along the track 114. Consequently, the position error control system operates at a rate of 60 kHz in the present example. This is four times the sampling rate that is used by the sector servo wedges 122 taken alone.

Figure 17:
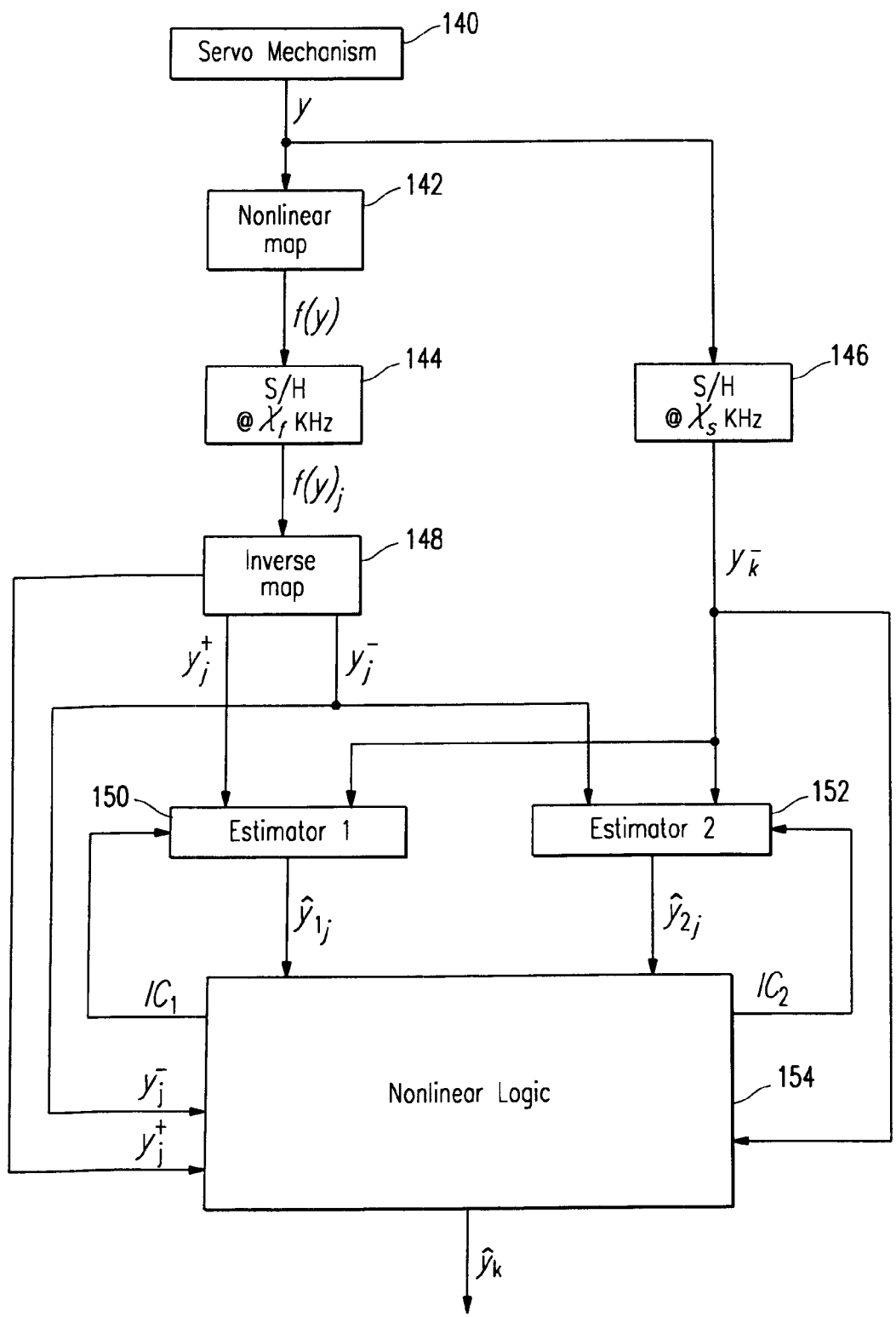
FIG. 17 is a block diagram of the logical circuits within a servo control system such as that used by a disk drive to estimate signals in accordance with the invention.

In accordance with the invention, a much higher sampling rate is made possible by position error estimation using the absolute value type of position error that can be derived from the data signals recorded along the track 114. Aspects of the operation of position error signal estimation circuit 130 are described in greater detail hereafter in connection with the block diagram of FIG. 17. FIG. 17 schematically illustrates aspects of the logical operations performed by the servo control system 110 of FIG. 16 and particularly the position error signal estimation circuit 130. FIG. 17 also illustrates aspects of the models underlying the control logic and the disk drive. The discussion of FIG. 17 is more general in many aspects than the FIG. 16 illustration, which reflects the fact that aspects of the control method are useful for systems other than hard disk drives. In the illustration of FIG. 17, the servomechanism 140 and the nonlinear map 142 represent the hard disk drive other than the position error signal estimation circuit 130. The nonlinear map 142 relates the observed error signal to the displacement of the head from its nominal position. The output from the FIG. 17 logic circuit 154 might be provided to the adjusting element 120 (FIG. 16) or might more generally be converted before being provided to the adjusting element 120.

The control logic arrangement of FIG. 17 receives as inputs from the hard disk drive the measurements of its sampled output signals including both the conventional, linear servo information derived from the sector servo wedges and the absolute value servo information that might be derived from error or constraint information characteristic of the data stored on the hard disk. Regardless of the source of the absolute value servo information, the illustrated example provides the linear servo information at a relatively low rate and the absolute servo information at a much higher rate. Thus, the linear servo information is provided at a frequency of Xs kHz and the absolute value servo information is provided at a much higher frequency Xf kHz. The control system operates at a frequency of Xc kHz which is higher than Xs but generally may be lower than Xf kHz. In the present example, the frequencies may be Xs=15 kHz, Xf=240 kHz and Xc=60 kHz, but these values are only exemplary.

For the hard disk drive.(HDD) of the example, y is the displacement and f(y) is the observable PES corresponding to the displacement and generated from reading the data track. f(y) is represented as a continuous signal and in practice f(y) may be available at sampling frequencies as high as 200 MHz. The servo control system is designed to operate at a frequency significantly higher than the linear servo information frequency because the higher frequency operation facilitates the better track following and settling properties of preferred embodiments of the present invention.

Figure 20:
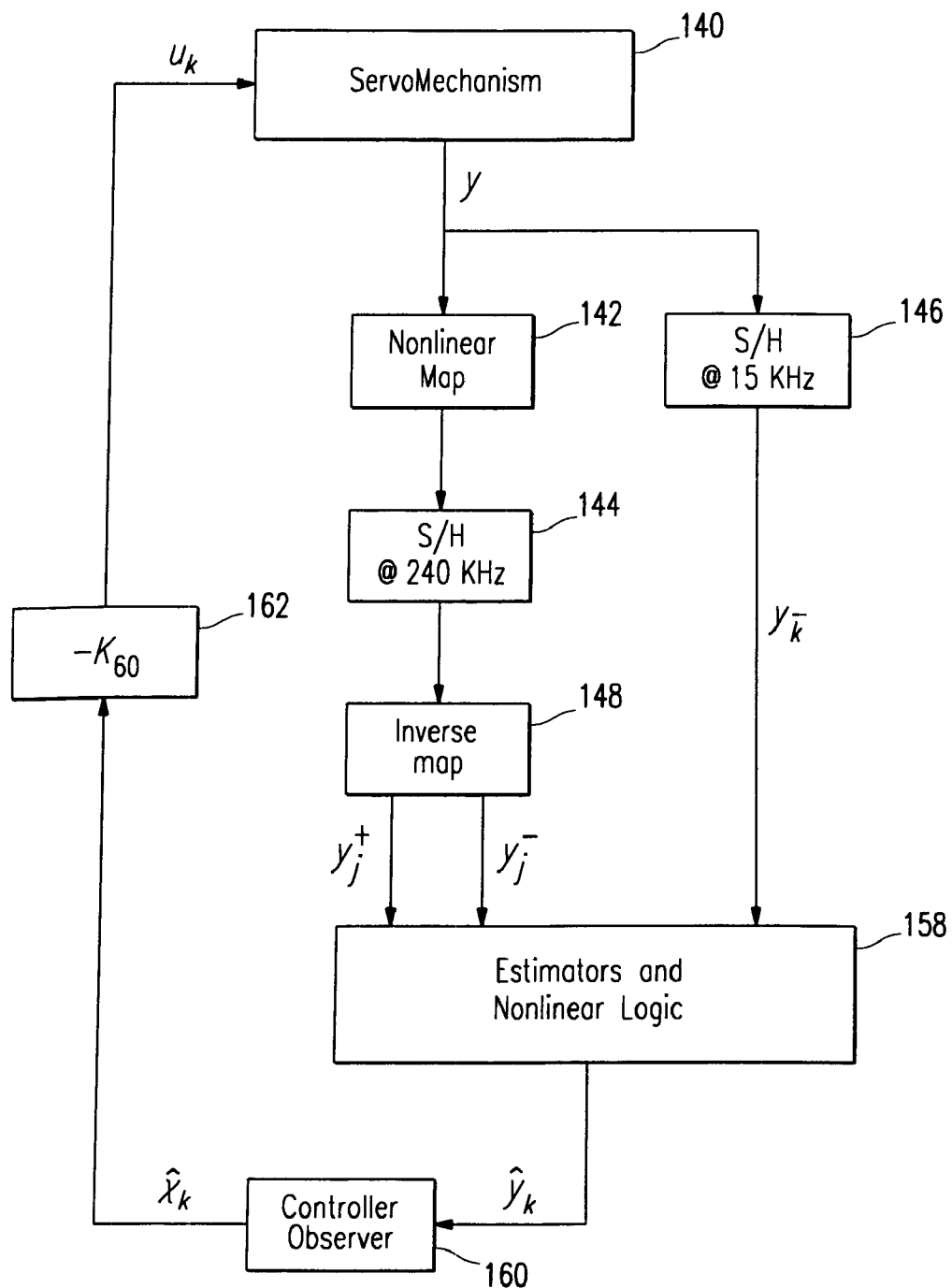
FIG. 20 illustrates aspects of a control system and a servomechanism consistent with the system shown in the block diagram of FIG. 17.

It is not necessary to operate at the higher frequency of the absolute value servo information to obtain improved performance. In some circumstances it is preferred not to operate at the highest frequency because the required circuitry is more complex and the resulting system may not be as stable as is desirable. It should be noted that an optimum control system for a system sampling information at a rate of 15 kHz is quite different from an optimum control system sampling information at 60 kHz. Moreover, a control system that is appropriate for making corrections using information sampled at a rate of 60 kHz is not expected to be optimum for a system operating at a rate of 240 kHz. Consequently, different models of the system dynamics might be used at different instances in the control logic illustrated in FIG. 17. The control system described below with reference to FIG. 20 is selected in part to operate at a frequency of 60 kHz, with certain of the servo information samples (one out of 4) representing linear servo information with an observed magnitude and sign and other of the servo information samples (3 out of 4) representing absolute value servo information available at a higher frequency but with an estimated sign. The absolute value servo information samples are themselves the result of multiple observations of the position error signal.

The arrangement of FIG. 17 includes a servomechanism 140 that produces a head to track displacement y at intervals during normal operation. In the servo control system model of FIG. 17, the servomechanism 140 represents servomechanism dynamics and response in a largely conventional manner. The illustrated control logic uses a time invariant model for the dynamics of the servomechanism, described by the following equations:

$$\dot{X}=AX+Bu, \; X(0)=X_0$$

$$y=CX \tag{1}$$

where X is the state vector, y is the scalar output and u is the scalar input. The matrices A, B, C each has appropriate dimensions with constant coefficients. This model is an approximation of a more complex model of the servo dynamics that is preferred in some instances and is discussed below. A simple model that captures the dominant characteristics of the dynamics is preferred in other instances because a simple model leads to a simpler and computationally less demanding algorithm and control design.

Figure 18:
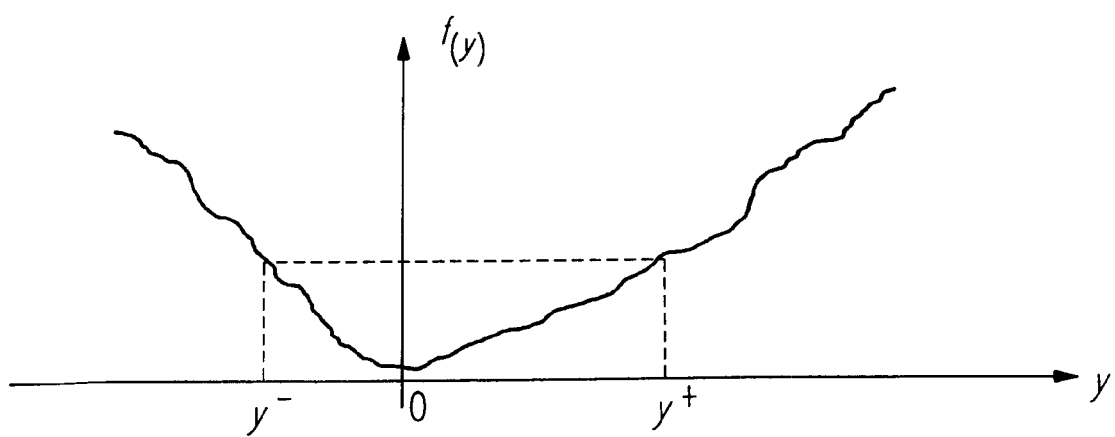
FIG. 18 illustrates another position error signal including additional information regarding the use of the position error signal graph as a nonlinear map in a system illustrated in part in FIG. 17.

The output y of the servomechanism 140 is an input to a nonlinear map 142 of y. Here, y is the controlled variable displacement, which is not directly observable and the nonlinear map produces the position error signal, which is observable. An example of the map 142 is shown in FIG. 18 and corresponds generally to the error information graphs illustrated in FIGS. 13 & 14. The output y gets converted into a nonlinear function f(y) representing the error rate. A given value of f(y) could be generated by two possible values of y, which are $y^+$ and $y^-$. The map 142 represents what happens in the disk drive to generate the position error signal f(y). As such, this map does not reflect logic circuitry but instead illustrates how the disk drive generates the observable variable that can be used as an indication of the displacement.

Block 144 in the arrangement of FIG. 17 is a sample and hold (S/H) device that samples and holds the value of f(y) at a sampling frequency of Xf kHz. The S/H device is typically implemented as a zero order hold (ZOH) and may be implemented as hardware or software. In the present example, Xf=240 kHz, which means that samples of f(y) are available every $$T_{240} = \frac{10^{-3}}{240} \text{ sec.}$$

The output of the S/H device 144 is $$f(y)_j = f(jT_{240})$$

which is a sequence of steps with values $f(y)_j$ at times $t=jT_{240}, j=1,2, \ldots$ In other words, $f(y)_j=f(y(t))$ for $jT_{240} \leq t < (j+1)T_{240}$.

A block 146 opposite the block 144 is a sample and hold (S/H) device that samples and holds the value of y at a sampling frequency of Xs kHz. In the present example, Xs=15 kHz. This means that low frequency, linear servo information component of y is available every $$T_{15} = \frac{10^{-3}}{15} \text{ sec.}$$

The output of S/H is a sequence of steps with values $y_{\bar{k}}=y(\bar{k}T_{15})$ at time $t=\bar{k}T_{15}, \bar{k}=1,2, \ldots$ i.e., $y_{\bar{k}}=y(t)$ for $\bar{k}T_{15} \leq t < (\bar{k}+1)T_{15}$.

The sample and hold device 144 is coupled to an inverse map 148. The inverse map 148 provides the inverse of the function provided by the nonlinear map 142 and the inverse of the function plotted in FIG. 18. Whereas the nonlinear map 142 provides the error rate f(y) for the scalar value y, the inverse map 148 provides the scalar displacement values $y_j^+$ and $y_j^-$ in response to the error rate $f(y)_j$. More particularly, the inverse map 148 uses the sampled values of $f(y)_j$ and the nonlinear mapping to obtain the corresponding sets of possible values of y at time intervals $t=jT_{240}$. As shown in FIG. 18, these values are denoted by $y_j^-, y_j^+$. For a given value of $f(y)_j$ there are two possible values of y at $t=jT_{240}$, i.e., $$y_j^- = y^-(jT_{240}), y_j^+ = y^+(jT_{240}).$$

An output of the inverse map 148, and the output of the sample and hold device 146 are coupled to a first estimator 150 (Estimator 1). As a practical matter, the inverse map 148 and the estimators are implemented as software, although aspects could be implemented in hardware. Estimator 1 is described by the following equations in which the letters A, B, C indicate discrete forms of the matrices discussed above:

$$\hat{x}_{1,j+1} = A_{240}\hat{x}_{1,j} + B_{240}u_k + K_{240}(C_{240}\hat{x}_{1,j} - \bar{y}_j^+), \hat{x}_1(\bar{j}T_{240}) = IC_1$$

$$\hat{y}_{1,j} = C_{240}\hat{x}_{1,j}$$

Where $\hat{x}_{1,j} = \hat{x}_1(jT_{240})$ is the value of the state $\hat{X}_1$ at time $t = jT_{240}$ $$\bar{y}_j^+ = \begin{cases} y_{\bar{k}}, & j = 16\bar{k} \\ y_j^+, & \text{otherwise.} \end{cases}$$

Ideally, $\bar{y}_j^+$ should be equal to $y_j = y(jT_{240})$. In that case it can be established that $\hat{x}_{1,j} \to x_j, \hat{y}_{1,j} \to y_j$ as $j \to \infty$ where $x_j = x(jT_{240})$. In other words, the state of the estimator converges to the actual state of the system. Since $y_j$ is not available, that is, it cannot be observed, the estimated value $y_{\bar{k}} = y(\bar{k}T_{15})$ is used. This is the actual measurement of y at $t=\bar{k}T_{15}$ (those intervals at which the linear servo information is available) and, for the times $y_{\bar{k}}$ is not available, the positive displacement generated from the observed PES using the inverse map 148 $y_j^+$ is used. As a matter of notational convention, $y_j^+$ is the value of $y_j = y(jT_{240})$ if $y_j$ is positive or $y_j^-$ if $y_j$ is negative. Since from the measurement $f(y)_j$ two possible values $y_j^+, y_j^-$ are obtained, Estimator 1 assumes the values of $y_j^+$ and a second estimator assumes the value of $y_j^-$. The second estimator (Estimator 2) is represented by a block 152 in FIG. 17.

$A_{240}, B_{240}, C_{240}$ are the corresponding matrices obtained by discretizing the servo mechanism 140 with sampling period $$T_{240} = \frac{10^{-3}}{240} \text{ sec.}$$

They are given by the relationships $$A_{240} = e^{AT_{240}}, \quad B_{240} = \int_0^{T_{240}} e^{A(T_{240}-\tau)} B \, d\tau$$

$$C_{240} = C$$

$u_k = u(kT_{60})$ is the actuator input to the servo mechanism 140 at $t=kT_{60}$, $k=1, 2, \ldots$ to be generated by the controller where $$T_{60} = \frac{10^{-3}}{60} \text{ sec}$$

is the sampling period used by the control loop.

$K_{240}$ is a design matrix chosen so that the matrix $A_{240} + K_{240}C$ has eigenvalues with magnitude less than one and close to zero. The location of the eigenvalues affect the speed of response of the estimator in that, by having them close to zero, the system response is faster.

$\hat{x}_1(\bar{j}T_{240}) = IC_1$ shows the initialization of the sequence at time $t=\bar{j}T_{240}$, for some integer $\bar{j}$, to $IC_1$ generated by the nonlinear logic block 154 which is coupled to the outputs of the estimators 150 and 152.

$\bar{y}_{1,j} = \hat{y}_1(jT_{240})$ is the output of Estimator 1.

Note that if for each j, $y_j$ is positive which means $y_j^+$ is the value of y that generated $f(y)_j$ then Estimator 1 assures that $\hat{y}_j \to y_j$ as $j \to \infty$.

Estimator 2, which is block 152 in FIG. 17, is described by the following equations:

$$\hat{x}_{2,j+1} = A_{240}\hat{x}_{2,j} + B_{240}u_k + K_{240}(C_{240}\hat{x}_{2,j} - \bar{y}_j^-), \hat{x}_2(\bar{j}T_{240}) = IC_2$$

$$\hat{y}_{2,j} = C_{240}\hat{x}_{2,j}$$

where $$\bar{y}_j^+ = \begin{cases} y_{\bar{k}}, & j = 16\bar{k} \\ y_j^+, & \text{otherwise} \end{cases}$$

$A_{240}, B_{240}, K_{240}, C_{240}, u_k$ are as defined in Estimator 1.

$\hat{x}_2(\bar{j}T_{240}) = IC_2$ shows the initialization of the sequence $\hat{x}_{2,j}$ at time $t=\bar{j}T_{240}$ to the value $IC_2$ generated by nonlinear logic 154.

The output of Estimator 2 is $\hat{y}_{2,j} = \hat{y}_2(jT_{240})$ at time $t=jT_{240}$. Estimator 2 assumes that the value of y in the inverse mapping of f(y) is negative and uses $y_j^-$ as the possible correct value of y at $t=jT_{240}$, with the exception of instants of time where $j=16\bar{k}$, i.e., the linear servo information is available, in which case the measured value of y, $y_{\bar{k}} = y(\bar{k}T_{15})$ is used.

Figure 19:
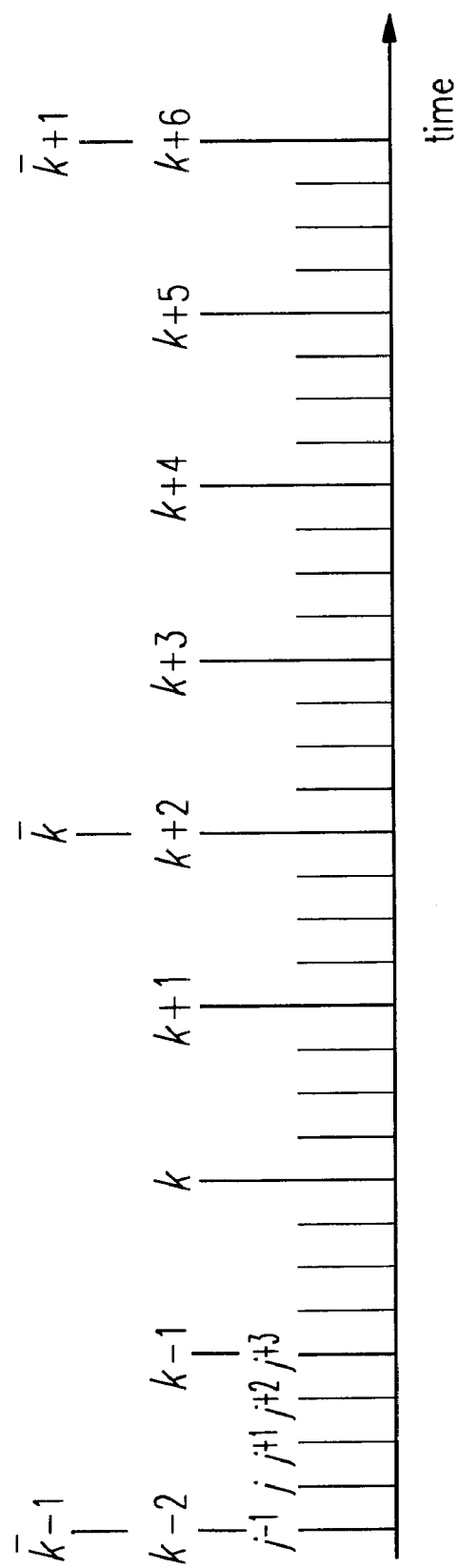
FIG. 19 is a diagrammatic plot showing the relation of the different information rates and timing provided to the nonlinear logic of FIG. 17.

The inputs to the nonlinear logic block 154 are $\hat{y}_{1,j} = \hat{y}_1(jT_{240})$ $\hat{y}_{2,j} = \hat{y}_2(jT_{240}), y_{\bar{k}} = y(\bar{k}T_{15})$ and $y_j^+, y_j^-$ where $j, \bar{k}$ are the time indices corresponding to sampling frequencies 240 kHz (high frequency servo) and 15 kHz (linear servo) respectively. The output of the logic block 154 is the estimate of the signal y at $t=kT_{60}$ and is denoted by $\hat{y}_k = \hat{y}(kT_{60})$ where k is the time index corresponding to the sampling frequency of 60 kHz. The relation of the indices is shown in FIG. 19.

Index $\bar{k}$ corresponds to time $t=\bar{k}T_{15}$

Index k corresponds to time $t=kT_{60}$

Index j corresponds to time $t=jT_{240}$ $\hat{s}_k$ is the estimate of the sign $s_k$ of $y_k = y(kT_{60})$. The functions of the nonlinear logic circuit 154 are described as follows:

1. If $j=16\bar{k}$ then $\hat{s}_k = \text{sgn}(y_{\bar{k}})$, in other words, if $j=16\bar{k}$ it means that the time instant is $t=\bar{k}T_{60}$. Since the value of the linear servo information $y_{\bar{k}} = y(\bar{k}T_{60})$ is available at this time instant, the sign of $y_{\bar{k}}$ is known and is output for use by the control system.
2. If $y_j^+$ or $f(y_j)$ at $j=4k$ is greater than $\epsilon\%$ of the track width, that is, the head is displaced sufficiently far away from the nominal, target track position, then $\hat{s}_k = \hat{s}_{k-1}$. The initial value of the sign estimate is chosen to be that of the actual signal at the last sampling interval. In other words if the value of $y_j^{+1\ or\ f(y}{}_j)$ is greater than $\epsilon\%$ where $\epsilon>0$ is a number that shows the level of noise, no sign change is anticipated from the previous step and therefore the sign remains the same. The value of $\epsilon$ is chosen, for example, to be slightly higher than the level of noise at the output y.

3. If $y_j^+$ or $f(y_j)$ at j=4k is less than $\epsilon\%$, then there are two cases:

3a. case I The value of $\bar{y}_{pk}$ of $y_k$ is predicted using the filter $$\hat{y}_{pk}=2\hat{y}_k-\hat{y}_{k-1}$$

which is developed using linear interpolation between $\hat{y}_{k-1}$ and $\hat{y}_{k-2}$. If $$\text{sgn}(\hat{y}_{pk})=\text{sgn}(\hat{y}_{k-1}),\ \text{then}\ \hat{s}_k=\hat{s}_{k-1}.$$

In other words, if the sign of the interpolated next step value of $y_k$ is predicted to be the same as the sign of the estimate $\hat{y}_{k-1}$ in the previous step, then no sign change is expected and therefore $\hat{s}_k=\hat{s}_{k-1}$.

3b. case II If $\text{sgn}(\hat{y}_{pk})\neq\text{sgn}(\hat{y}_{k-1})$ then $$\hat{s}_k = \begin{cases} 1, & \text{if } (\hat{y}_{1,j}^2-y_j^{+2})^2<(\hat{y}_{2,j}^2-y_j^{-2})^2,\ j=4k \\ -1, & \text{otherwise} \end{cases}$$

and $$IC_1 = \hat{x}_{2,j}\ \text{if}\ \hat{s}_k=-1\ \text{and}\ j=4k$$
$$IC_2 = \hat{x}_{1,j}\ \text{if}\ \hat{s}_k=-1\ \text{and}\ j=4k$$

In other words, if the sign of the predicted value of $y_k$ is different from the sign of the estimate $\hat{y}_{k-1}$ at the previous step, then it is expected that the sign of $y_k$ changes between those time intervals. In this case, the previously discussed comparison is made to determine how close the outputs of the estimators are to the assumed correct values of $y_j^+,y_j^-$. For example, if $y_j$ was positive, then $y_j^+$ was the correct value and, if $y_j$ was negative, then $y_j^-$ was the correct value. Therefore the estimator that used the correct value will have an estimated output that is closer to the correct value. For example, if $$(\hat{y}_{1,j}{}^2-y_j^{+2})^2<(\hat{y}_{2,j}{}^2-y_j^{-2})^2\ \text{at}\ j=4k$$

is satisfied, that means Estimator 1 is the one that used the correct value which in turn implies that $y_j$ is expected to be positive, in other words $\hat{s}_k=1$. If the above inequality is not true, then that would imply that Estimator 2 is the correct one and $\hat{s}_k=-1$. The incorrect estimator has to have its state re-initialized to that of the correct estimator to prevent the previous estimation errors from being propagated. Therefore the initial conditions $IC_1$, $IC_2$ for the estimators are chosen as indicated above.

4. Estimate $\hat{y}_k$

The estimate of $\hat{y}_k$ is formed as follows:

$$\hat{y}_k = \begin{cases} y_{\bar{k}} & \text{if } k=4\bar{k} \\ \hat{y}_{1,j} & \text{if } \hat{s}_k=+1\ \text{and}\ j=4k\ \text{but}\ k\neq 4\bar{k} \\ \hat{y}_{2,j} & \text{if } \hat{s}_k=-1\ \text{and}\ j=4k\ \text{but}\ k\neq 4\bar{k} \end{cases}$$

In other words, the estimate $\hat{y}_k=\hat{y}(kT_{60})$ is the operation at the time instant ($k=4\bar{k}$) where $y_{\bar{k}}$, the actual sampled value of y is available, and it is used because the linear servo information provides both magnitude and sign for the displacement. If not, then use is made of the output of the estimator at all the other time intervals, depending on the value of $\hat{s}_k$. If $\hat{s}_k=1$, then the output of Estimator 1 is used, and if $\hat{s}_k=-1$, the output of Estimator 2 is used.

The estimated value $\hat{y}_k$ of y at $t=kT_{60}$ is used to design a controller to operate at 60 kHz frequency. The design of an appropriate servo system is conventional and might, for example, be designed in accordance with the general teachings of chapter 14 of Franklin, et al., *Digital Control of Dynamic Systems* 649–687 (1998), which chapter describes the so-called Workman model and is hereby incorporated by reference. The block diagram of the controller together with the blocks for generating $\hat{y}_k$ are shown in FIG. 20. The illustrated control system, including the estimators, nonlinear logic, and controller, is preferably implemented using software, for example within a digital signal processor as is presently conventional in the art.

The arrangement of FIG. 20 includes a controller observer 160 which represents the observer that uses the estimated value of y to generate an estimate of the state x of the model of the servomechanism at time instances $t=kT_{60}$ where $$T_{60} = \frac{10^{-3}}{60}\ \text{sec}.$$

The controller 160 is described by the equations $$\hat{x}_{k+1}=A_{60}\hat{x}_k+B_{60}u_k+G_{60}[C_{60}\hat{x}_k-\hat{y}_k]$$

where $A_{60}$, $B_{60}$, $C_{60}$ are the discrete-time matrices of the servomechanism dynamics model (1) sampled at 60 KHz, in other words, $$A_{60} = e^{AT_{60}},\quad B_{60} = \int_0^{T_{60}} e^{A(T_{60}-\tau)}B\,d\tau$$

$G_{60}$ is a matrix chosen so that the eigenvalues of $A_{60}+G_{60}C_{60}$ have a magnitude less than one and close to zero.

The arrangement of FIG. 20 includes, block 162, which outputs a control signal $u_k$ in response to the input of an estimate of the variable x. The output control signal is given by $$u_k=-K_{60}\hat{x}_k$$

where $K_{60}$ is a controller gain matrix that is designed so that the magnitudes of the eigenvalues of the matrix $A_{60}-B_{60}K_{60}$ are less than one and at suitable regions in order to meet the control objectives. The value of K60 can be chosen using an $H_\infty$ frequency domain approach or other suitable methods.

In the case of a hard disk drive (HDD), y is the displacement and the controller gain $K_{60}$ is preferably designed to meet the following objectives:

Achieve one track seek in less than 1.5 milliseconds. One track seek is assumed to be complete when the displacement is less than 3% of the track width.

The closed-loop system bandwidth should not exceed 1.5 kHz to avoid excitation of the high-frequency modes of the system.

The maximum peak of the complementary sensitivity and sensitivity functions should not exceed 3–4 dB to avoid amplification of disturbances, facilitate satisfactory system settling time and system robustness. The complementary sensitivity Hcs and sensitivity Hs functions are defined, respectively, as follows:

$$H_{cs} = \frac{K(s)H(s)}{1+K(s)H(s)}, \quad H_s = \frac{1}{1+K(s)H(s)}$$

where K(s) denotes the controller transfer function and H(s) denotes the transfer function of the hard disk drive dynamics. It should be appreciated that the particular servo control model will be adapted for each disk drive and, generally, for each particular drive to obtain optimum performance.

Figure 21:
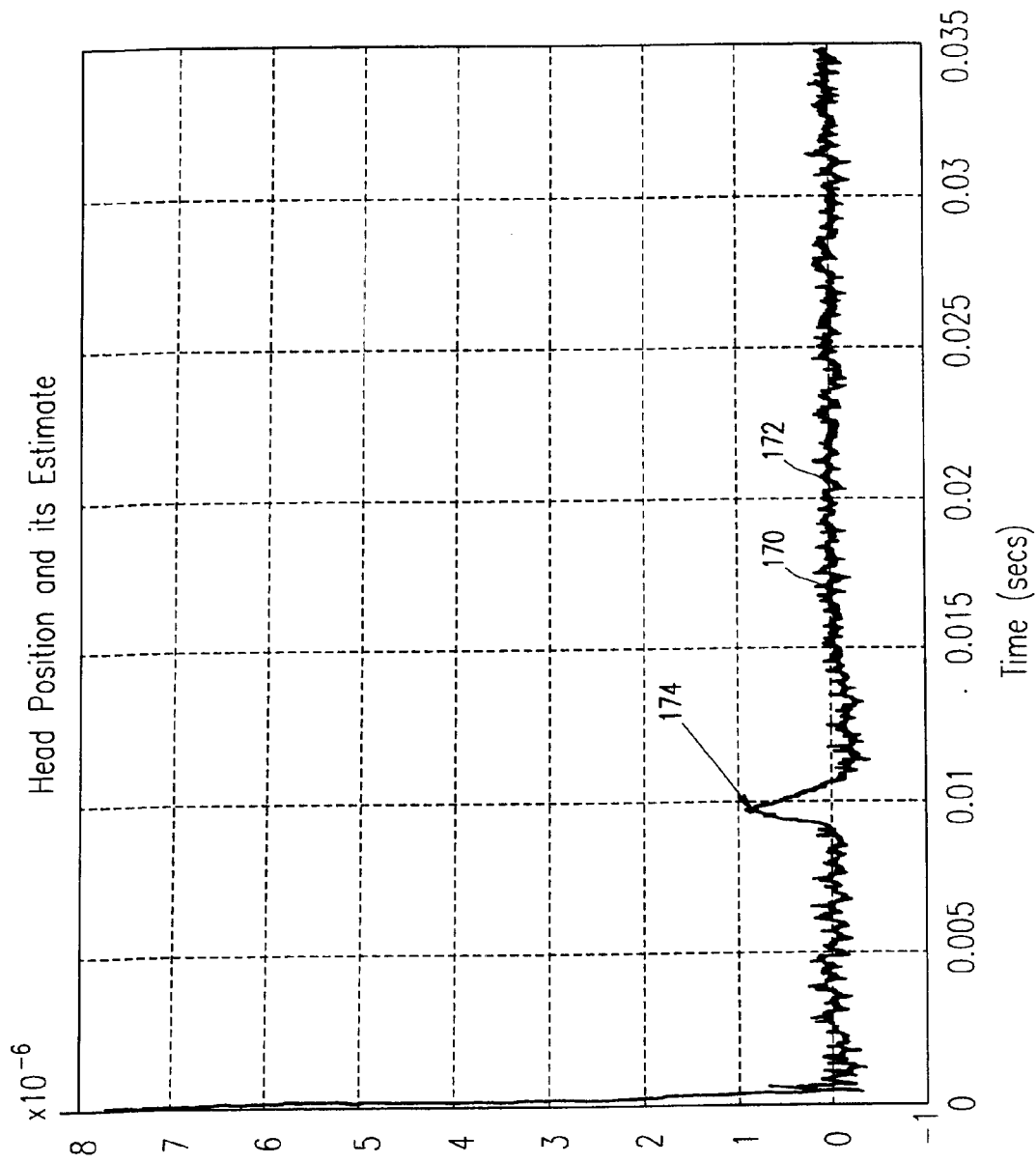
FIG. 21 compares an actual position error signal with its estimate, as a function of time, generated by the logic circuit shown in block diagram form in FIG. 17.
Figure 22:
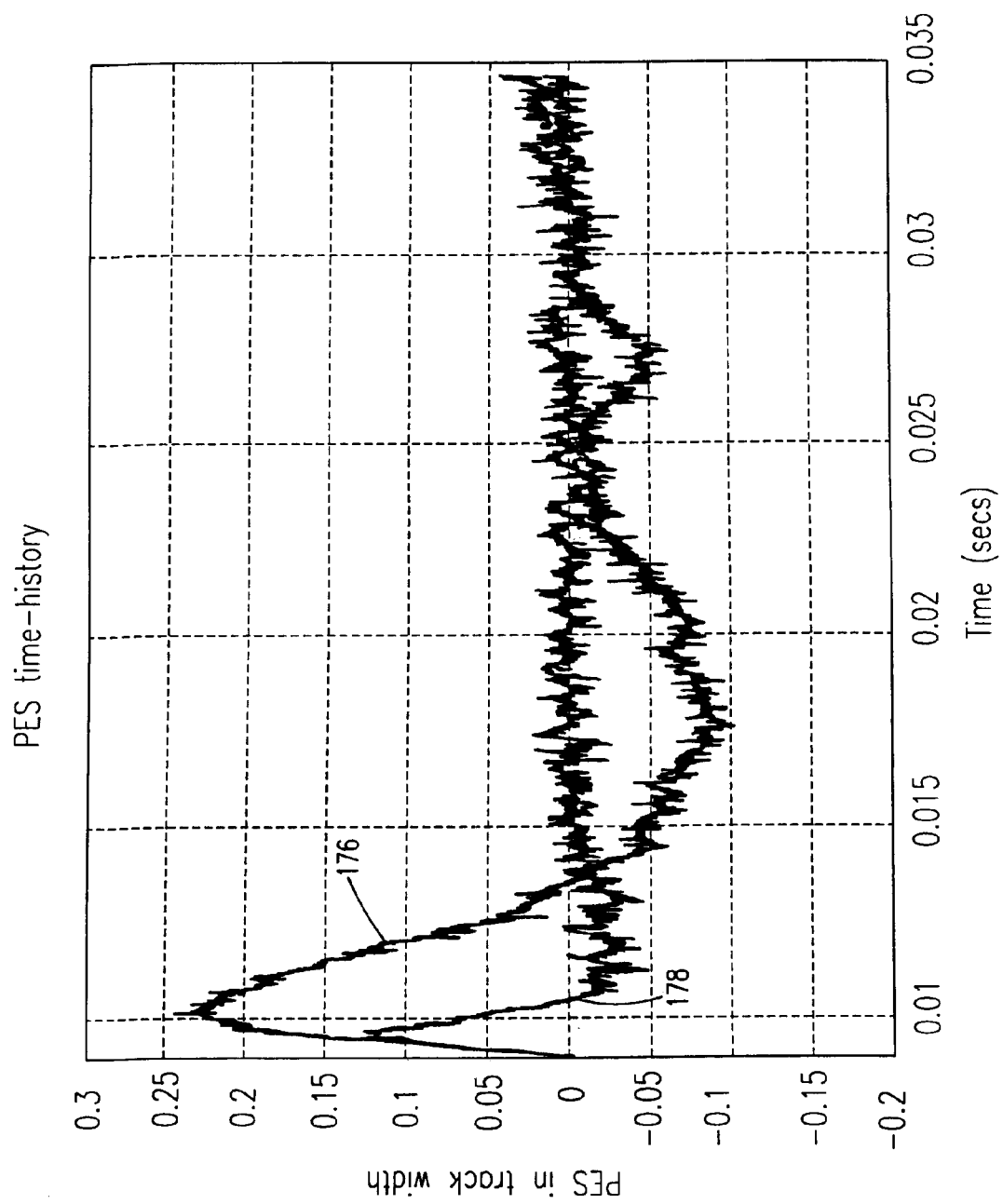
FIG. 22 shows as a function of time during and after an impulse disturbance the position error signal with and without the estimated position error signal and control functions of an embodiment of the present invention.

In the simulations illustrated in the graphs of FIGS. 21 and 22, the following transfer function model describing the hard disk drive dynamics was used:

$$Y(s) = \frac{k_v k_y}{s(s+k_f/m)} \sum_{j=1}^{4} \frac{b_{2j}\omega_j + b_{2j-1}\omega_j^2}{s^2 + 2\zeta_j\omega_j s + \omega_j^2} U(s) \quad (2)$$

where Y(s), U(s) denote the Laplace transforms of the head position and actuator input, respectively. The parameters of the model are listed in Table 1.

TABLE 1

System Parameters

| Parameter | Description | Value | Units |
|---|---|---|---|
| m | Moving mass of actuator | 0.2 | Kilograms |
| $K_t$ | Force constant | 20 | Newton/amp |
| $k_v = k_t/m$ | Normalization constant | 200 | |
| $K_y$ | Position measurement gain | 10000 | Volts/M |
| $K_f$ | Viscous friction constant | 2.51 | N-sec/M |
| $\omega_1$ | Resonance: VCM isolator | $2\pi 70$ | Rad/sec |
| $\omega_2$ | Resonance: head suspension | $2\pi 2200$ | Rad/sec |
| $\omega_3$ | Resonance: actuator arm carrier | $2\pi 4000$ | Rad/sec |
| $\omega_4$ | Resonance: coil structure | $2\pi 9000$ | Rad/sec |
| $B_1$ | First resonance coupling | -0.00575 | — |
| $B_2$ | First resonance coupling | 0.0000115 | $sec^{-1}$ |
| $B_3$ | Second resonance coupling | 0.0230 | — |
| $B_4$ | Second resonance coupling | 0 | $sec^{-1}$ |
| $B_5$ | Third resonance coupling | 0.8185 | — |
| $B_6$ | Third resonance coupling | 0 | $sec^{-1}$ |
| $B_7$ | Fourth resonance coupling | 0.1642 | — |
| $B_8$ | Fourth resonance coupling | 0.0273 | $sec^{-1}$ |
| $\zeta_1$ | First resonance damping | 0.05 | — |
| $\zeta_2$ | Second resonance damping | 0.005 | — |
| $\zeta_3$ | Third resonance damping | 0.05 | — |
| $\zeta_4$ | Fourth resonance damping | 0.005 | — |

A careful consideration of the transfer, function model given by equation (2) set forth above for the servo mechanism 140 of FIG. 17 suggests that the mode corresponding to the first resonant frequency of 70 Hz is preferably neglected for control design purposes. The next resonant frequencies are at 2.2 kHz, 4 kHz and 9 kHz. If the closed-loop bandwidth is kept at less than 1.5 kHz, the modes corresponding to these frequencies can be neglected for control purposes. These considerations lead to the approximation $$\sum_{j=1}^{4} \frac{b_{2j}\omega_j + b_{2j-1}\omega_j^2}{s^2 + 2\zeta_j\omega_j s + \omega_j^2} \approx 1$$

and therefore the hard disk drive dynamics can be approximated by the following transfer function model $$Y(s) = \frac{10^6}{s(s+10)} U(s)$$

which represents the reduced-order dynamics to be used for control design and is also described by equation (2) of the servo mechanism 140. The servo controller is designed based on the reduced-order model but is simulated and analyzed using the full-order system.

FIG. 21 shows plots of the actual displacement and its estimate as generated by the arrangement shown in FIG. 17. A plot 170 is of the actual displacement, while a plot 172 is of its estimate. As shown, the plots are substantially identical and cannot be discriminated in this view, even when an impulse 174 is applied to the systems. This indicates a high level of accuracy in the predicted positions as well as dynamics for the described absolute value control methodology.

FIG. 22 shows the head displacement as a function of time during and after a disturbance that displaces the head using the same structure controller as the one described above, for two different cases. In one case representing conventional systems, no estimation of the displacement takes place and the linear servo signal at 15 kHz is used. The controller also operates at the 15 kHz frequency. The top plot 176 in FIG. 22 shows the head displacement as a function of time for the 15 kHz case. The bottom plot 178 shows the head displacement as a function of time when the estimated value of PES is sampled at 240 kHz and the controller operates at 60 kHz as shown in FIG. 20. As illustrated, the disk drive controlled in accordance with aspects of the present invention demonstrated significantly better response and stability as compared to conventional systems.

FIG. 23 shows the head displacement as a function of time after a track seek using the controller described above for the same two cases discussed with reference to FIG. 22. In one case representing conventional systems, no estimation of the displacement takes place and the linear servo signal at 15 kHz is used for positional control. The controller operates at the 15 kHz frequency. The y-axis displacement is measured in units of track width and the x-axis time is measured in milliseconds. The top plot 180 in FIG. 23 shows the head displacement as a function of time for the 15 kHz case. The bottom plot 182 shows the head displacement as a function of time when the estimated value of PES is sampled at 240 kHz and the controller operates at 60 kHz as shown in FIG. 20. As illustrated, the disk drive controlled in accordance with aspects of the present invention provided significantly better response and stability as compared to conventional systems. For example, the faster response and settling time is illustrated as producing a seek time improvement on the order of one half millisecond.

As discussed above, the preferred source for position error signals (PES) for positional control of a head with respect to a track in a disk drive is the data within the track itself. More particularly, the preferred PES signals are derived from information about errors characteristic of the data or the data signals that are stored on the disk. Another related, preferred source of PES is derived from constraint information characteristic of the data or data signals in conjunction with the data or data signals themselves. The derivation of this sort of error and constraint information is described in the above-referenced and incorporated Despain application.

Figure 24:
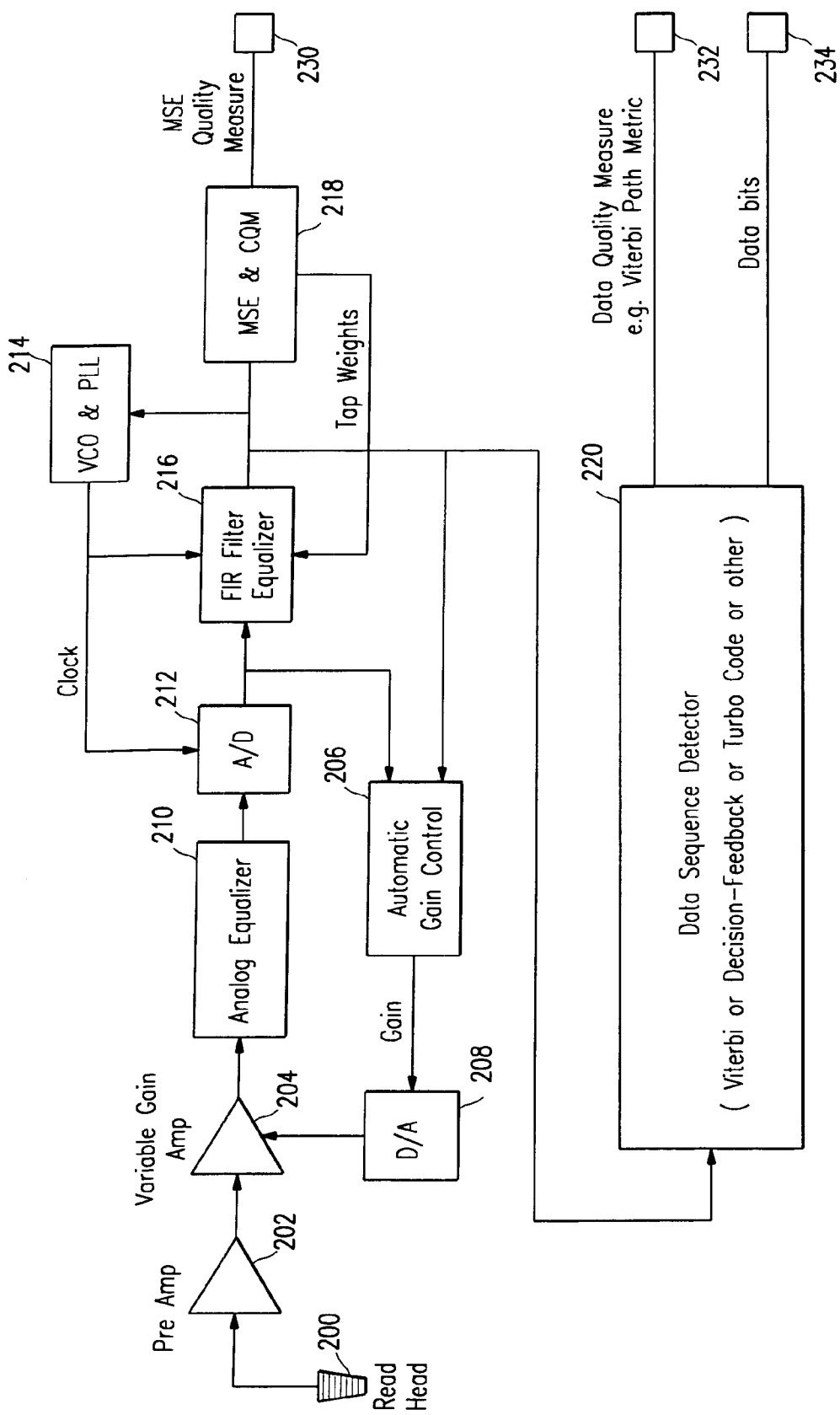
FIG. 24 illustrates aspects of a read channel circuit in accordance with preferred embodiments of the present invention.

FIG. 24 illustrates what is generally known as the read channel of a hard disk drive, which is typically embodied on a single chip, sometimes as an ASIC (application specific integrated circuit), sometimes as a specialized chip and sometimes as a set of functionality within a digital signal processing (DSP) chip. Individual circuit elements of the read channel chip are familiar to those of skill in the art and are described in such patents as U.S. Pat. Nos. 5,585,975, 5,754,353 and 5,961,658. Each of these patents is hereby incorporated by reference for their teachings related to the structure and function of the circuit elements and collections of elements illustrated in FIG. 24. In most conventional disk drives, a read channel chip which may be in many ways similar to that illustrated in FIG. 24 is used to receive and process the linear servo information provided in the sector servo wedges of conventional disk drives. For example, aspects of such usage are described in U.S. Pat. No. 5,825,579, which patent is also incorporated by reference.

The read channel illustrated in FIG. 24 is especially adapted for practice of aspects of the present invention and of the control methods and systems described in the Despain application. Several measures of quality or, equivalently, errors are generated in the read channel chip of FIG. 24. Most preferably, at least one of these error measures is provided as an output from the chip illustrated in FIG. 24. For example, one or more of the error measures might be provided to a corresponding one or more of the output terminals or pins of the chip. Such an output terminal or pin is a particularly preferred source of the absolute value PES signals utilized in particularly preferred implementations of the present invention within the hard disk drive environment.

Referring to FIG. 24, the read head 200 is identified with shading to indicate that it is not on the read channel chip but instead provides the signals that the read channel chip processes. Signals output from the read head 200 are provided to a preamplifier 202 that performs a conventional broad band amplification. The output from the preamplifier 202 is provided to a variable gain amplifier 204 whose gain is adjusted so that the signals presented to the rest of the circuitry have an amplitude within a range of acceptable amplitudes. Automatic gain control (AGC) logic 206 detects signal levels and certain other signal characteristics from digitizing and equalizing circuitry within the read channel chip and from these signals derives the gain for the variable gain amplifier 204. AGC logic 206 provides the gain to a digital to analog converter 208, which in turn supplies the gain to the variable gain amplifier 204.

The signal output by the variable gain amplifier is analog and has peak voltages more precisely in the desired range. The variable gain amplifier is coupled to an analog equalizer 210. Analog equalizer 210 adjusts the signal level across a range of received frequencies to remove some of the frequency dependent effects of the read head and other parts of the read channel circuitry. After equalization, the signal is provided to the analog to digital converter 212, which operates in accordance with a clock signal provided by the clock recovery circuitry 214 to filter the input analog signals.

As illustrated in FIG. 24, the clock recovery circuitry 214 includes a phase locked loop (PLL) detector for identifying and extracting the clock information and a voltage controlled oscillator (VCO) for generating a clock signal appropriate to the rest of the circuitry in the read channel chip.

The output of the analog to digital converter 212 is output to a second equalizer 216 that is used to further equalize the signal. In the illustrated circuit, the second equalization circuit is provided in the form a finite impulse response (FIR) filter. The equalization provided by FIR filter 216 is adjusted according to the detected signal levels to accommodate the data received by the circuit. This adaptive equalization process is accomplished by adjusting the weighting of the FIR filter using information provided by a slicer 218. The slicer 218 generates estimated sample values by comparing individual sample values to expected sample values. For example, the slicer might compare each sample received to values set for logic signals of +1, 0 and −1 and assign to each sample the logic signal that comes closest to matching its value. These estimates are used for adjusting the gain, for adjusting the clock recovery circuitry, and for adjusting the equalization process.

As part of the functions of the slicer 218, the slicer generates a measure of channel quality by comparing each of the values received by the slicer to the value that the slicer assigned to that sample. For example, a difference measurement can be calculated for each sample. A first sample provided to the slicer has a voltage VS. The slicer determines that the voltage VS is closest in value to the voltage V1 that is expected for samples that correspond to the logic value +1. That sample is preliminarily assigned the logic value +1 and the slicer can then generate a error measure for that sample equal to VS−V1. Alternately, the error measure for that sample might correspond to the absolute value of this difference or the square of this difference. Various statistical analyses might be performed on the collected error measures generated by sequences of samples. These collected error measures conventionally provide the mean squared error (MSN) and the channel quality measure (CQM) within the chip.

The error measure output from the slicer is typically accumulated on the read channel chip to evaluate the performance of the chip or the storage system. In accordance with the present invention, however, the error measure generated by the slicer 218 is provided to one of the output pins or terminals for the chip. This error signal has absolute value qualities and is generated at a rate that can be as high as the data rate. As such, the signal is particularly useful in practicing aspects of the present invention.

Referring again to FIG. 24, the equalized data signal output from the FIR equalization filter 216 is output to the data sequence detector 220. The illustrated detector is preferably appropriate to the data encoding scheme used in storing the data on the surface of the storage disk. In preferred embodiments of the present invention, a Viterbi decoder is used as the data sequence detector 220. The design and use of such detectors is well known and is illustrated, for example, in the above-referenced and incorporated U.S. Pat. No. 5,754,353.

Figure 25:
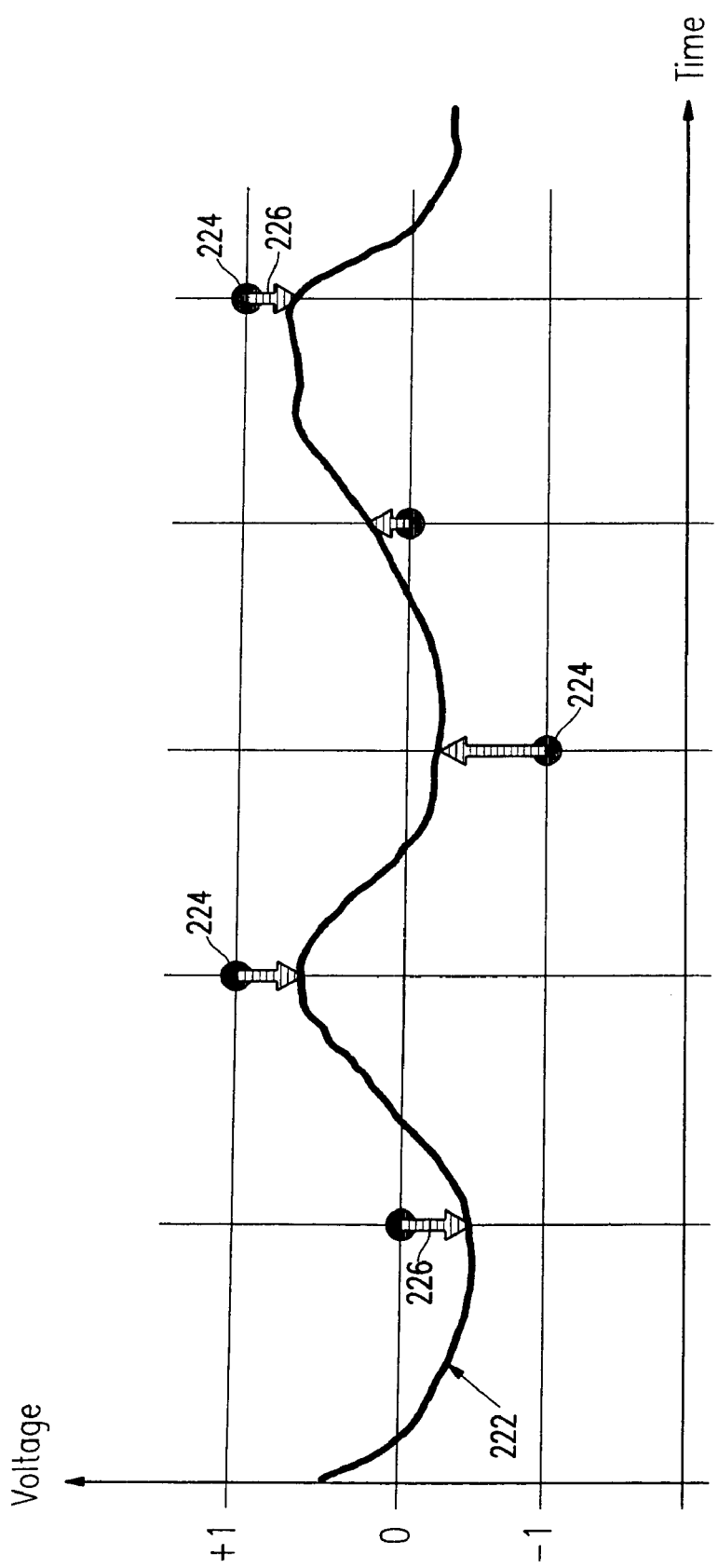
FIG. 25 illustrates aspects of data decoding within a Viterbi or similar trellis-type decoder.

FIG. 25 illustrates aspects of the decoding operation within a Viterbi decoder. The trellis-like graph illustrates the time variations of the signal values 222 input to the decoder 220. From sequences of sample values, the decoder determines what values certain sequences of samples most likely have. The sequence of most likely values are indicated on the graph of FIG. 25 as heavy dots 224. The fitting of the most likely data sequence to identify the output data represents the use of a constraint as that term is used here and in the Despain application discussed above.

The decoder 220 outputs the sequence of best fit data points 224 as the data output from the read channel circuitry. The decoder 220 also generates an error measure for each sample that relates to the difference between the Viterbi decoder assigned value (224) and the actually received value (222). This difference 226 is identified in the graph as gray arrows associated with each of the samples. In normal usage, this error measure 226 might be accumulated within the read channel chip as a measure of system performance or channel quality. Conventionally this error measure is not available while data are being transmitted off the read channel chip.

Preferred embodiments of the FIG. 24 read channel provide the read channel error measure derived from the Viterbi decoder directly to an output terminal or pin for the read channel chip. As shown in the figure, the slicer error measure may be provided to an output terminal 230, the error measure from the data sequence detector 220 might be output from a terminal 232 and the output data bit stream may be provided through a terminal 234. As a general matter, most systems will include only one of the error measure output signals 230 and 232. These signals might be provided to an output terminal that is selectable between the two error measure signals during manufacture. For example, the value supplied through output terminal may be selectable during manufacture using a programmable fuse.

The output error measure signal is available at terminals 230, 232 at rates as high as the data rate and has absolute value characteristics. In fact, the error measure 226 (FIG. 25) is functionally much like the error measure graph shown in FIG. 13. Consequently, this output 226 over terminals 230 or 232 (FIG. 24) is particularly useful in practice of the present invention.

It should be appreciated that the error measure provided as an output from the read channel chip need not be available continuously because there may be reasons that the terminal is switched to other uses through multiplexing. Appropriate error measure signals are available from the preferred read channel chip at a higher data rate than conventional servo signals and are available while the data are being read and as data are being output from the chip. In addition, it is preferred that the read channel chip continue to process and output conventional linear servo information in the conventional manner so that it can be available for use in the manner described above where linear servo information is used in combination with absolute value data. Of course, if all servo operations are performed without the linear servo information, there would be no need to provide for processing linear servo information within the read channel chip.

Although the present invention has been described in detail with reference only to the presently preferred embodiments, those of ordinary skill in the art will appreciate that various modifications can be made without departing from the invention. For example, the present invention has been described in terms of a hard disk drive in which both of linear servo and absolute value information are used in following a track. This need not be true. For example almost all operations can be performed without using the linear servo operations. It is furthermore conceivable that no conventional servo information would be stored on at least parts of a disk within a disk drive practicing aspects of the present invention. Accordingly, the invention is defined by the following claims and is not to be limited to the particular preferred embodiments described here.

What is claimed:

1. A read channel chip for use with a data storage unit storing data signals according to an encoding scheme, the data storage unit characterized by a controlled variable, the read channel chip for use with a control system operative with an observable variable having an absolute value functional relationship to the controlled variable, the read channel chip comprising:

a signal line providing a signal stream representative of data stored on the data storage unit;

a data estimation circuit, the data estimation circuit assigning values to samples derived from the signal stream and assigning an error measure to the samples; and a data output terminal outputting data at a data rate and an error measure output terminal outputting a signal representative of the error measure, wherein signals are provided concurrently on the data output terminal and the error measure output terminal outputting the signal representative of the error measure at a rate sufficient to allow the signal to be used in the control system for servo control of the controlled variable.

2. The read channel chip of claim 1, wherein the error measure is generated by a data sequence detector.

3. The read channel chip of claim 2, wherein the data sequence detector is a Viterbi decoder.

4. The read channel chip of claim 1, wherein the error measure is generated by a slicer that estimates data during an adaptive equalization process.

5. The read channel chip of claim 1, wherein the error measure has an absolute value functional relationship with error in an alignment of a hard disk drive read head and a data track.

6. The read channel chip of claim 1, wherein the read channel circuit outputs a linear servo signal at a first frequency and outputs an absolute value error measure at a second frequency.

7. The read channel chip of claim 6, wherein the second frequency is at least about four times the first frequency.

8. A read channel circuit for use with a data storage unit storing data signals according to an encoding scheme, the data storage unit characterized by a controlled variable, the read channel circuit for use with a control system operative with an observable variable having an absolute value functional relationship to the controlled variable, the read channel circuit comprising:

a signal line providing a signal stream representative of data stored on the data storage unit;

a data estimation circuit, the data estimation circuit assigning values to samples derived from the signal stream and assigning an error measure to the samples; and a data output terminal outputting data at a data rate and an error measure output terminal outputting a signal representative of the error measure, wherein signals are provided concurrently on the data output terminal and the error measure output terminal and the error measure has an absolute value functional relationship with error in an alignment of a hard disk drive read head and a data track.

9. A read channel circuit for use with a data storage unit storing data signals according to an encoding scheme, the data storage unit characterized by a controlled variable, the read channel circuit for use with a control system operative with an observable variable having an absolute value functional relationship to the controlled variable, the read channel circuit comprising:

a signal line providing a signal stream representative of data stored on the data storage unit;

a data estimation circuit, the data estimation circuit assigning values to samples derived from the signal stream and assigning an error measure to the samples; and a data output terminal outputting data at a data rate and an error measure output terminal outputting a signal representative of the error measure, wherein signals are provided concurrently on the data output terminal and the error measure output terminal and the read channel circuit outputs a linear servo signal at a first frequency and outputs an absolute value error measure at a second frequency.

10. The read channel circuit of claim 9, wherein the second frequency is at least about four times the first frequency.

* * * * *